United States Patent
Blankenship et al.

(10) Patent No.: US 9,648,514 B2
(45) Date of Patent: May 9, 2017

(54) METHOD AND SYSTEM FOR PROTOCOL LAYER ENHANCEMENTS IN DATA OFFLOAD OVER SMALL CELLS

(71) Applicant: BlackBerry Limited, Waterloo (CA)

(72) Inventors: Yufei Wu Blankenship, Kildeer, IL (US); Zhijun Cai, Herndon, VA (US); Shiwei Gao, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 48 days.

(21) Appl. No.: 13/963,676

(22) Filed: Aug. 9, 2013

(65) Prior Publication Data
US 2015/0043435 A1    Feb. 12, 2015

(51) Int. Cl.
| | | |
|---|---|---|
| H04W 28/08 | (2009.01) | |
| H04L 29/08 | (2006.01) | |
| H04L 1/16 | (2006.01) | |
| H04L 1/18 | (2006.01) | |

(52) U.S. Cl.
CPC ......... *H04W 28/085* (2013.01); *H04L 1/1614* (2013.01); *H04L 1/188* (2013.01); *H04L 69/322* (2013.01)

(58) Field of Classification Search
None
See application file for complete search history.

(56) References Cited

U.S. PATENT DOCUMENTS

| | | | | |
|---|---|---|---|---|
| 2010/0279679 A1* | 11/2010 | Young et al. | | 455/423 |
| 2010/0322193 A1* | 12/2010 | Hu et al. | | 370/331 |
| 2010/0322194 A1* | 12/2010 | Hu et al. | | 370/331 |
| 2012/0287912 A1* | 11/2012 | Suzuki et al. | | 370/332 |
| 2013/0010619 A1* | 1/2013 | Fong et al. | | 370/252 |
| 2013/0010709 A1* | 1/2013 | Earnshaw et al. | | 370/329 |

FOREIGN PATENT DOCUMENTS

| | | |
|---|---|---|
| EP | 2012457 | 1/2009 |
| EP | 2015498 | 1/2009 |
| WO | 2010019492 | 2/2010 |
| WO | 2010147974 | 12/2010 |
| WO | 2011008997 | 1/2011 |

OTHER PUBLICATIONS

3 GPP TS 36.323: "Evolution Universal Terrestrial Radio Access (E-UTRA): Packet Data Convergence Protocol (PDCP) Specification", V11.2.0, Mar. 2013.
3GPP TS 36.322: "Evolution Universal terrestrial Radio Access (E-UTRA):Radio Link Control (RLC) Protocol Specification", V11. 0.0, Sep. 2012.

(Continued)

*Primary Examiner* — Hassan Phillips
*Assistant Examiner* — Omeed D Rahgozar
(74) *Attorney, Agent, or Firm* — Fish & Richardson P.C.

(57) ABSTRACT

A method at a first wireless network element, the method receiving, from a second wireless network element, a plurality of packet data units (PDUs) for a user equipment; transmitting the PDUs to the user equipment (UE); compiling a PDU delivery status report in response to the transmitting of the PDUs; and sending the compiled PDU delivery status report to the second wireless network element.

24 Claims, 15 Drawing Sheets

(56) References Cited

OTHER PUBLICATIONS

3GPP TS 36.423: "Evolution Universal terrestrial Radio Access (E-UTRA): X2 application protocol (X2AP) (Release 11)", V11.2.0, Sep. 2012.
3GPP TS 36.331: "Evolution Universal terrestrial Radio Access (E-UTRA):Radio Resource Control (RRC), Protocol specification (Release 11)", V11.0.0, Jun. 2012.
U.S. Appl. No. 13/745,051, "Communicating Data Using a Local Wireless Access Network Node", filed Jan. 18, 2013.
3GPP TS 36.300 : "Evolution Universal terrestrial Radio Access (E-UTRA) and Evolution Universal terrestrial Radio Access Network (E-UTRAN): Overall description; Stage 2 (Release-11)", V11.5.0, Mar. 2013.
R2-131621, "Email Discussion Report on U-Plane Alternatives [81bis#19]", Nokia Siemens Networks (Rapporteur), May 2013.
R2-131786, "Analysis of Latency Related Issues for UP Protocol Alternatives", Huawei, HiSilicon, May 2013.
R2-131797, "Consideration on UP Alternatives 2C and 3C", Pantech, May 2013.
3GPP TR 36.842: "Evolution Universal terrestrial Radio Access (E-UTRA): Study on Small Cell Enhancements for E-UTRA and E-UTRAN—Higher layer aspects (Release 12)", V0.2.0, May 2013.
The International Search Report and Written Opinion mailed Oct. 27, 2014; in PCT patent application No. PCT/US2014/050396.
Office Action issued in Canadian Application No. 2,920,660 on Oct. 31, 2016; 3 pages.

\* cited by examiner

METHOD AND SYSTEM FOR PROTOCOL LAYER ENHANCEMENTS IN DATA OFFLOAD OVER SMALL CELLS

FIELD OF THE DISCLOSURE

The present disclosure relates to heterogeneous networks in particular relates to the offloading of data for a user equipment (UE) from a macro cell to a small cell.

BACKGROUND

Demand for wireless data is expected to increase significantly in the near term due to the popularity of smart phones and other wireless devices. To meet this growing data demand, one solution is to deploy small cells in areas where such demand exists. Due to the small footprint of small cells, the same frequency can be reused more often in a given area compared to a macro-cell, thus giving more system capacity over a given area.

A cell corresponds to a coverage area provided by a wireless access node. A coverage area can refer to a region where UEs can be provided by a wireless access node with services to a target level. A wireless access node can refer to an active electronic device that is capable of sending, receiving, and forwarding information over a communication channel, and of performing designated tasks. A wireless access node is responsible for performing wireless transmissions and receptions with UEs. Cell and wireless access node are used interchangeably in places where there is no ambiguity. In one embodiment, a UE may, while under the coverage of a small cell and a macro cell, be served by both the macro cell and the small cell. In this case of dual radio connections, the macro cell may provide all control plane functions while small cell provides the bulk of the user plane functions for the dual-connection capable UE.

Control plane functions involve exchanging certain control signaling between a wireless access node and a UE to perform specified control tasks, such as any or some combination of the following: network attachment of a UE, authentication of the UE, setting up radio bearers for the UE, mobility management to manage mobility of the UE (mobility management includes at least determining which infrastructure network nodes will create, maintain or drop uplink and downlink connections carrying control or user plane information as a UE moves about in a geographic area), performance of a handover decision based on neighbor cell measurements sent by the UE, transmission of a paging message to the UE, broadcasting of system information, control of UE measurement reporting, and so forth. Although examples of control tasks and control messages in a control plane are listed above, it is noted that in other examples, other types of control messages and control tasks can be provided. More generally, the control plane can perform call control and connection control functions, and can provide messaging for setting up calls or connections, supervising calls or connections, and releasing calls or connections.

User plane functions relate to communicating traffic data (e.g. voice data, user data, application data, etc.) between the UE and a wireless access network node. User plane functions can also include exchanging control messages between a wireless access network node and a UE associated with communicating the traffic data, flow control, error recovery, and so forth.

The small cell connection can be added or removed from a UE under the control of the macro-cell. For UEs capable of dual connections, the macro cell may be considered to be a primary cell which provides control layer functions visible to the enhanced packet core (EPC) while the small cell acts as a secondary cell for data offload.

However, if the data is offloaded logically between the packet data convergence protocol (PDCP) and the radio link control (RLC) layer then, in an acknowledged mode, the RLC layer will need to acknowledge the PDCP packet data units (PDUs) and this will require communication between the small cell and the macro cell. Such acknowledgements over the backhaul may create significant backhaul traffic and further, latency on the backhaul may cause timeouts in certain circumstances. Similar issues exist when the offloading is performed with radio link control (RLC) layer PDUs.

BRIEF DESCRIPTION OF THE DRAWINGS

The present disclosure will be better understood with reference to the drawings, in which.

DETAILED DESCRIPTION OF THE DRAWINGS

Figure 1:
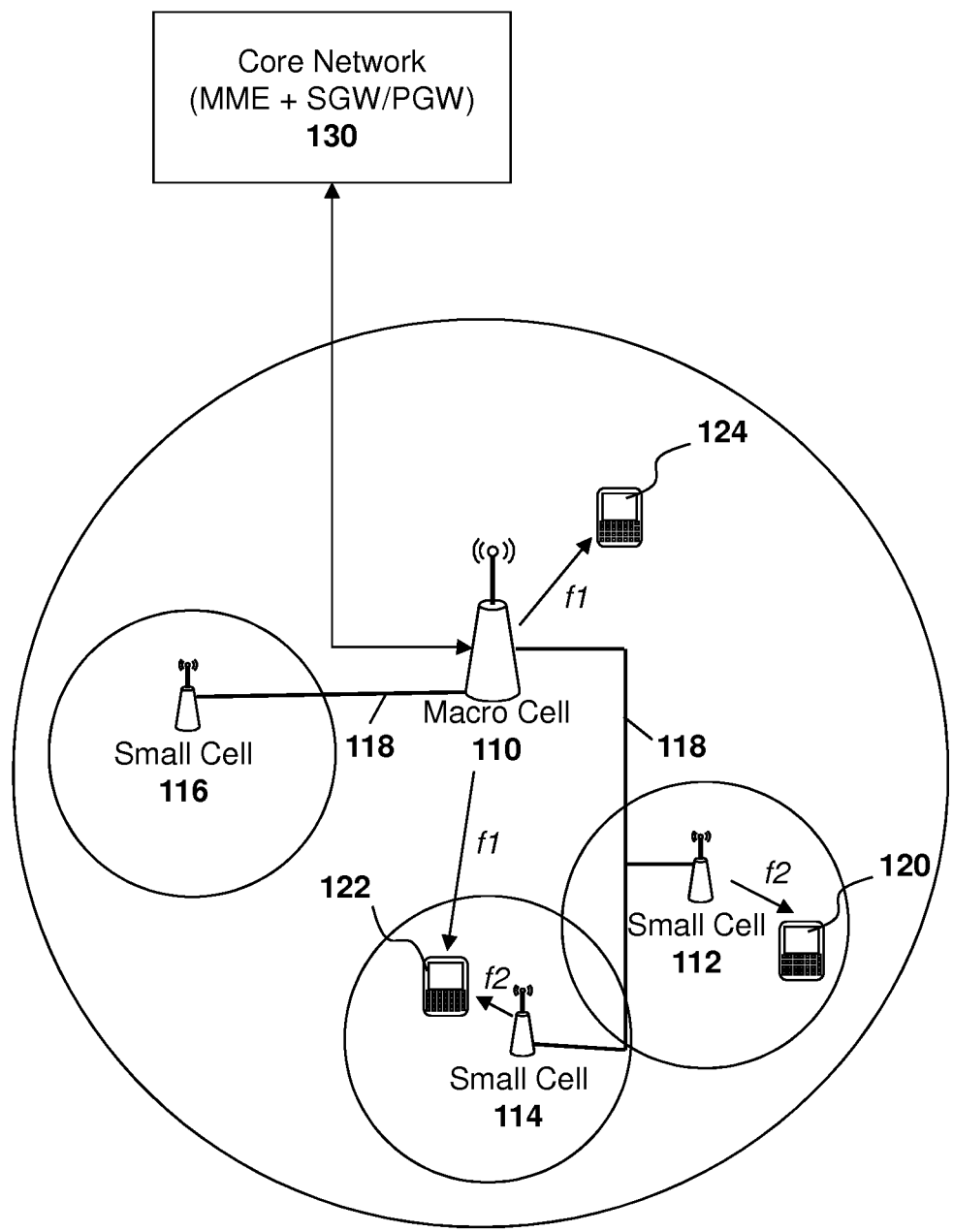
FIG. 1 is a block diagram showing an example network architecture having a macro cell and a plurality of small cells.

The present disclosure provides a method at a first wireless network element comprising: receiving, from a second wireless network element, a plurality of packet data units (PDUs) for a user equipment; transmitting the PDUs to the user equipment (UE); compiling a PDU delivery status report in response to the transmitting of the PDUs; and sending the compiled PDU delivery status report to the second wireless network element.

The present disclosure further provides a first wireless network element comprising a processor, configured to: receive, from a second wireless network element, a plurality of packet data unit (PDUs) for a user equipment; transmit the PDUs to the user equipment (UE); compile a PDU delivery status report in response to the transmitting of the PDUs; and send the compiled PDU delivery status report to the second wireless network element.

The present disclosure further provides a method at a first wireless network element comprising: receiving, from a second wireless network element, a plurality of packet data unit (PDUs) for a user equipment; transmitting the PDUs to the user equipment (UE); and receiving a discard indication from the second wireless network element to discard a subset of the PDUs; and discarding the indicated subset of PDUs.

The present disclosure further provides a first wireless network element comprising a processor, configured to: receive, from a second wireless network element, a plurality of packet data unit (PDUs) for a user equipment; transmit the PDUs to the user equipment (UE); receive a discard indication from the second wireless network element to discard a subset of the PDUs; and discard the indicated subset of PDUs.

The present disclosure further provides a method at a first wireless network element comprising: sending, from the first wireless network element to a second wireless network element, a plurality of packet data unit (PDUs) for a user equipment; receiving a PDU delivery status report from the second wireless network element; and discarding a service data units (SDU) according to the PDU delivery status report.

The present disclosure further provides a first wireless network element comprising a processor configured to: send, from the first wireless network element to a second wireless network element, a plurality of packet data unit (PDUs) for a user equipment; receive a PDU delivery status report from the second wireless network element; and discard a service data units (SDU) according to the PDU delivery status report.

The present disclosure further provides a method at a first wireless network element comprising: sending, from the first wireless network element to a second wireless network element, a plurality of packet data unit (PDUs) for a user equipment (UE); receiving a delivery status report originating from the UE; and discarding a service data unit associated with a PDU sent to the second wireless network equipment from a buffer according to the delivery status report.

The present disclosure further provides a first wireless network element comprising a processor configured to: send, from the first wireless network element to a second wireless network element, a plurality of packet data unit (PDUs) for a user equipment (UE); receive a delivery status report originating from the UE; and discard a service data unit associated with a PDU sent to the second wireless network equipment from a buffer according to the delivery status report.

The present disclosure further provides a method at a first wireless network element comprising: determining establishment of two radio connections for a UE; compiling a control message that contains a radio resource configuration of each of the two radio connections; and sending the control message to the UE.

The present disclosure further provides a first wireless network element comprising a processor configured to: determine establishment of two radio connections for a UE; compile a control message that contains a radio resource configuration of each of the two radio connections; and send the control message to the UE.

One issue associated with a large number of small cells deployed in an area associated with a macro cell deals with the complexity of mobility management. Since small cells by definition have a small coverage area, a mobile device that is moving through small cells would require handover more frequently. This significantly increases signaling traffic in the core network (i.e. between the mobility management entity (MME) and the serving gateway (SGW)) since the core network is involved in handovers. More frequent handovers also mean a higher possibility of dropped calls due to handover failures.

One potential for small cell deployment is that small cells are deployed in areas under the coverage of a macro cell. In addition, small cells may operate at different carrier frequencies from the macro cell in order to avoid interference between the macro cell and small cells. Such small cells may include, but are not limited to, femto cells, pico cells, relay nodes, among others.

Reference is now made to FIG. 1, which shows an example of small cell deployment in a macro cell. In the embodiment of FIG. 1, a macro cell 110 is shown, along with three small cells 112, 114 and 116. Two different carrier frequencies are deployed in the example of FIG. 1. The macro cell uses a carrier f1 while the small cells use a carrier f2. Further, a backhaul 118 exists between macro cell 110 and each of small cells 112, 114 and 116.

Three user equipments, namely user equipments 120, 122 and 124 are shown. In the example of FIG. 1, UEs 120 and 124 only support a single radio link connection, such as some UEs deployed for the $3^{rd}$ Generation Partnership Project (3GPP) Long Term Evolution (LTE) Architecture, release 11 and earlier.

While the present disclosure is described using the LTE architecture, other architectures could equally be used with the embodiments described herein, and the use of LTE is for illustrative purposes only.

Thus, UEs 120 and 124 may be a single radio connection for LTE prior to release 12. Such UEs can connect either to the macro cell or the small cell.

Conversely, UE 122 may be capable of dual radio link connections and the UE can thus receive data from and/or transmit data to both the macro evolved node B (eNB) and small cell eNB simultaneously or in time division multiplexing (TDM) mode when under the coverage of both cells.

Further, in LTE Release 10 and 11, carrier aggregation (CA) was introduced, where more than one carrier frequency can be supported by a UE. Each carrier forms a cell and dynamic data scheduling over different carriers is supported under such architecture. When different carriers are deployed in different sites and backhaul latency between the sites is low (e.g. below 30 micro seconds), a centralized medium access control (MAC) packet scheduler can be used to perform dynamic data scheduling over the carriers, where one carrier can be used to form a macro cell (primary cell) while the other carrier could be used to form small cells (secondary cells). This is also referred to as inter-site CA.

In the inter-site CA case, a UE is always connected to the primary cell and mobility between small cells is done simply by activation or de-activation of a small cell for a UE, and thus no core network is involved. However, inter-site CA requires low latency backhaul and such low latency backhaul is not always available in practice.

In the case where a high latency (e.g. from a few milliseconds up to 50 ms) backhaul between the macro-cell and a small cell exists, CA may not be possible. Specifically, centralized dynamic data scheduling for different small cells may not possible due to backhaul latency, and therefore data scheduling with independent MAC scheduler is more appropriate in such circumstances. However, to reduce frequent handover and signalling overhead in the core network, some coordination between the macro-cell and small cells may still be used.

In one embodiment, UE 122 which is under the coverage of the small cell and the macro cell may be served by both the macro-cell and the small cell. In this case, the macro-cell may provide all the control plane functions while the small cell provides the bulk of the user plane functions for the dual-connection capable UE. In another alternative, the macro cell may provide most of the control plane functions such as the mobility related control functions, measurement related control functions, etc. The small cell may still provide certain control plane functions such as the radio bearer configuration/reconfigurations, radio resource allocation functions, etc.

A small cell connection can be added or removed from a UE under the control of the macro cell, thus removing cell changes at the core network 130. Specifically, the addition or removal of the small cell for a UE would be transparent to the core network, (i.e. MME and SGW) 130. For UEs that do not implement such technology, these UEs would simply connect to either the small cell or the macro cell.

Figure 2:
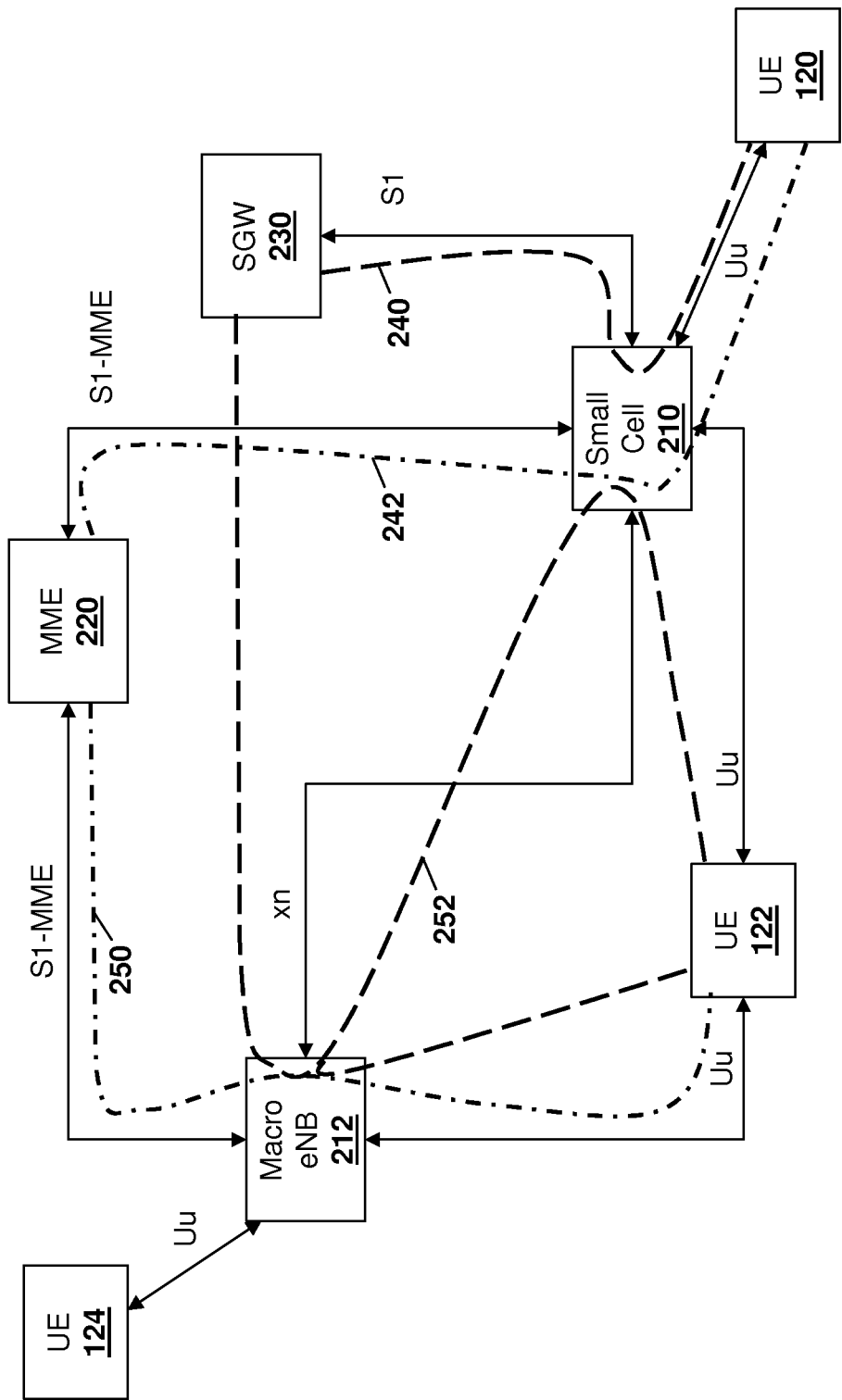
FIG. 2 is block diagram showing control plane and user plane traffic flows for various user equipments.

Reference is now made to FIG. 2, which shows a conceptual diagram of the embodiment of FIG. 1 in which UE 122 has dual connections. Some numbering from FIG. 1 is reused in FIG. 2.

In the embodiment of FIG. 2, small cell 210 provides a representation of any small cell. UE 120 connects directly to small cell since it is not capable of dual connections.

Similarly, UE 124 connects directly to the macro eNB 212.

UE 122 is capable of dual connection and thus connects to both small cell 210 and macro eNB 212.

Connections for both control plane and user plane data are provided over an air interface (referred to here as Uu interface) between the UEs and the eNBs they are connected to.

MME 220 provides control data over logical control paths, while SGW 230 provides for user plane data over logical data paths.

In particular, for UE 120, since it is only being served by small cell 210, the data path 240 flows between SGW 230, through small cell 210, to UE 120. Similarly, the control path 242 flows between MME 220, through small cell 210, to UE 120.

For UE 124, since it is connected to the macro eNB, both the control and data paths flow directly through the macro eNB (not shown).

For dual connection UE 122, the control path 250 flows between MME 220, through the macro eNB 212 to the UE 122. However, the data path 252 flows through the macro eNB 212 and may be split either to the small cell 210 via the backhaul link (referred to here as Xn) or go directly to the UE 122. Thus, the UE 122 may receive data from both the macro eNB 212 and the small cell 210 simultaneously. In another alternative, the UE 122 may receive the data only from the small cell 210.

In the embodiments below, only eNB functions related to dual connection UEs are considered. Note that a dual connection is a logical connection, where physically the UE may or may not have simultaneous uplink/downlink transmissions to two network nodes.

For UEs capable of dual connections, the macro cell can be considered as a primary cell which provides all control layer functions visible to the EPC while the small cell acts as a secondary cell for data offload. The main difference from the Release 11 LTE carrier aggregation environment is that due to potential large backhaul latency, the centralized scheduling at the medium access control (MAC) level for all carriers is no longer possible.

Due to the data split between the macro and small cells described above, the protocol stack needs to be split at some point. Various options are possible for splitting the user plane protocol stack. The options include a data split before the PDCP, a data split between the PDCP and RLC layers, and a data split between the RLC and the MAC layers. While the discussion below primarily focuses on the data split between the PDCP and RLC layers, similar problems and solutions apply to, e.g., the data split between the RLC and the MAC layers.

Data Split Before PDCP

Figure 3:
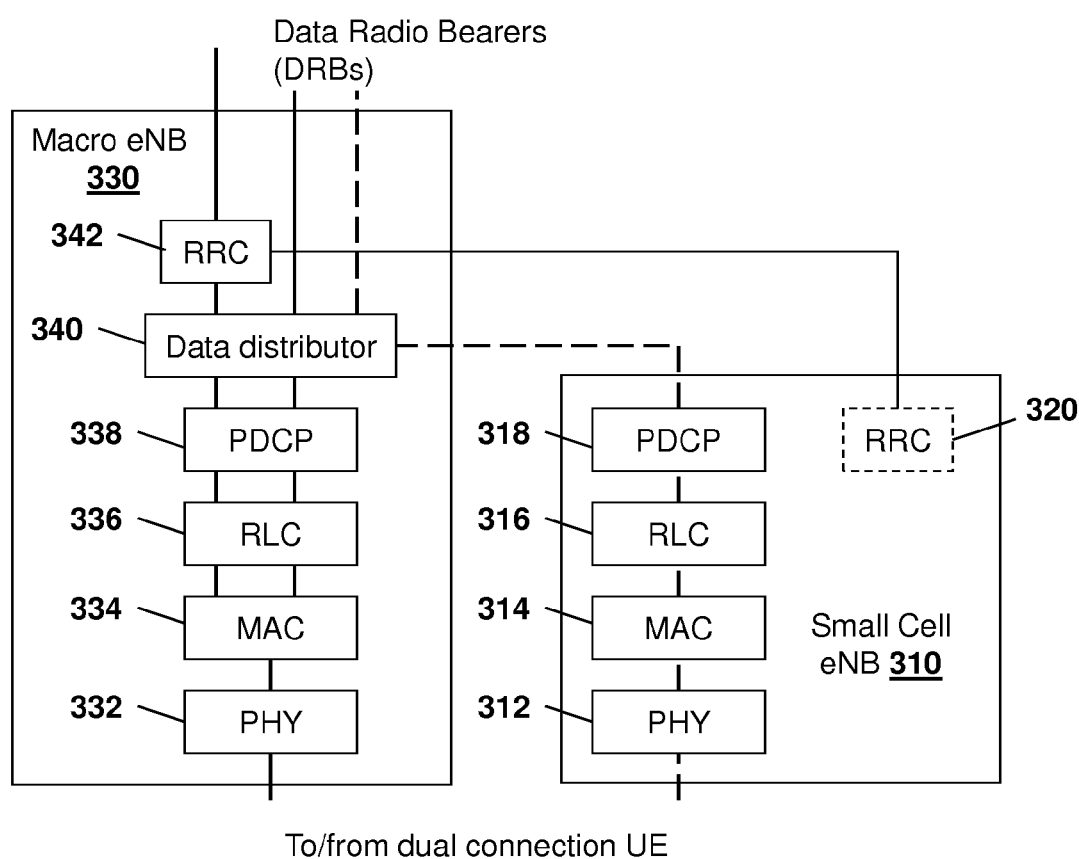
FIG. 3 is block diagram showing a protocol stack where user plane traffic is split between a macro cell and a small cell above a PDCP layer.

One example of data distribution in protocol layers in the macro-eNB and small eNB for dual connection UEs is shown with regard to FIG. 3, where data distribution in the macro-eNB occurs before PDCP layer. The data distribution is performed at the radio bearer (RB) level. In other words, the PDUs associated with some RBs are offloaded through the small cell while all PDUs associated with other RBs are sent through the macro-cell. The small cell performs all layer 1 to layer 3 functions associated with the UE, including some radio resource control (RRC) functions for radio configurations, where the RRC function in the macro eNB and in the small cells coordinate so that from the UEs point of view the control plane is handled only by the macro-eNB.

In particular, as seen in FIG. 3, a small cell 310 includes a physical (PHY) layer 312, a MAC layer 314, an RLC layer 316 and a PDCP layer 318. Further, as shown in FIG. 3, small cell eNB 310 has some RRC functions as shown by RRC layer 320.

Macro eNB 330 includes a physical layer 332, a MAC layer 334, an RRC layer 336, and a PDCP layer 338. In the example FIG. 3, the data split occurs before the PDCP layer, and thus a data distributor 340 is provided above the PDCP layer 338.

For control traffic, an RRC layer 342 is provided above the data distributor.

As seen in the embodiment of FIG. 3, downlink control data proceeds through the RRC 342, through the data distributor 340, through the PDCP layer 338, through the RLC layer 336, and to the MAC layer. Uplink control data proceeds in the reverse direction.

Similarly, downlink user plane data may proceed from data radio bearers (DRBs), through the data distributor 340, and then proceeds either through the PDCP layer 338, RLC layer 336, to MAC layer 334 of macro eNB 330 or may be distributed to the small cell 310 and proceed through the PDCP layer 318, RLC layer 316, MAC layer 314 and to the physical layer 312.

MAC layer 334 combines the control and user plane data before sending the data to the physical layer 332 for sending to a UE.

In the embodiment of FIG. 3, the UE must be able to distinguish whether RRC message is applicable for the connection to the macro eNB or the small cell.

Data Split Between PDCP and RLC

Figure 4:
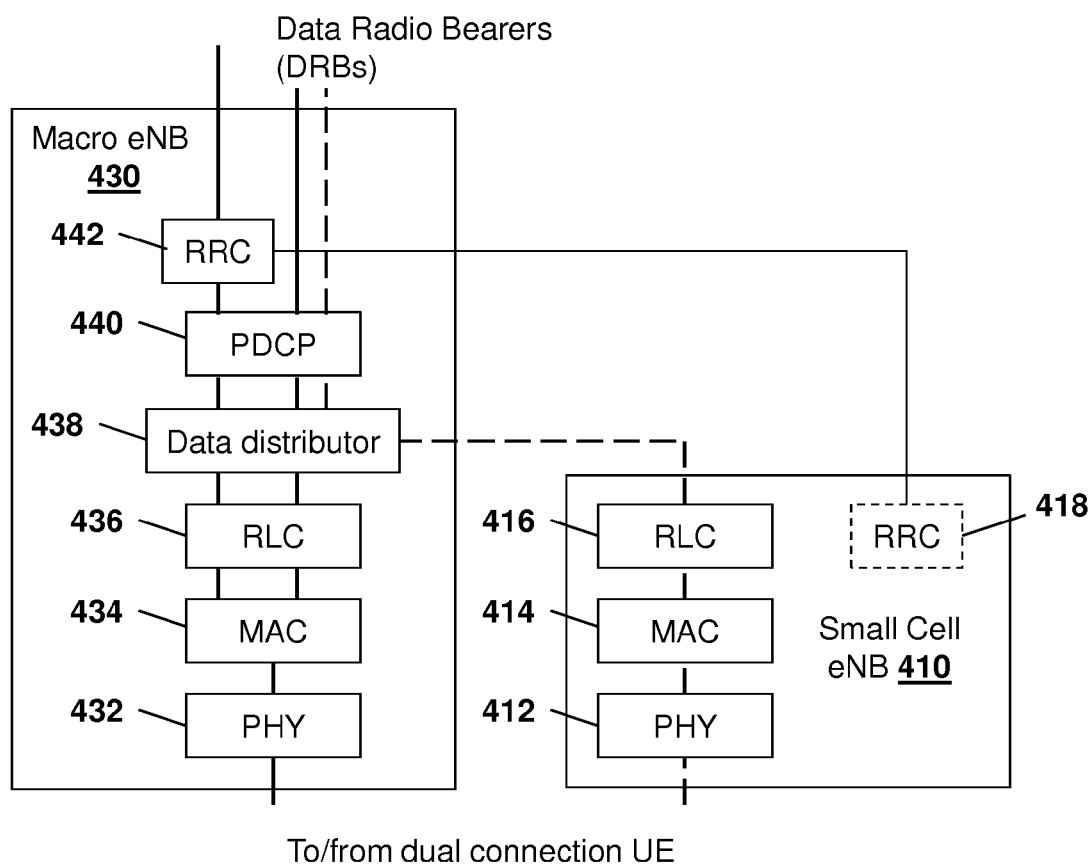
FIG. 4 is block diagram showing a protocol stack where user plane traffic is split between a macro cell and a small cell between a PDCP layer and an RLC layer.

In a further embodiment, the data distribution function in the macro eNB can be implemented after the PDCP layer. This is shown in the example of FIG. 4, where the data distribution in the macro-eNB occurs after the PDCP layer. In particular, in the example of FIG. 4, a small cell 410 includes a physical layer 412, a MAC layer 414 and an RLC layer 416. Further, a light RRC layer 418 is provided in the example of FIG. 4.

Similarly, macro eNB 430 includes a physical layer 432, a MAC layer 434, and an RLC layer 436. Data distributor 438 is provided between RLC layer 436 and PDCP layer 440.

The RRC layer 442 is provided above the PDCP layer 440 for control functionality.

In the example of FIG. 4, data distribution is still performed at the radio bearer (RB) level. In other words, all packet data units (PDUs) associated some RBs are offloaded through the small cell while all PDUs associated with other RBs are sent through the macro-cell.

The small cell in the embodiment of FIG. 4 may perform physical layer as well as MAC and RLC functions associated with the UE. Again, some RRC functions may be performed by the small cell but from the UE point of view the control plane is handled by the macro-eNB. The option where the UE also sees a light RRC control in the small cell is also valid.

Thus, in the embodiment of FIG. 4, control messages may proceed through RRC layer 442 through PDCP layer 440, data distributor 438, RLC layer 436, to MAC layer 434. Further, some coordination may exist between RRC layer 442 and RRC layer 418 at the small cell 410.

With regard to user plane traffic, for traffic that proceeds through the macro eNB 430, such traffic proceeds directly from PDCP layer 440 to data distributor 438, and then to the RLC layer 436 and to the MAC layer 434. MAC layer 434 combines the user and control plane traffic and forwards the combination to the physical layer 432.

Similarly, data that proceeds through the small cell 410 proceeds through PDCP layer 440 of the macro eNB 430 and then is distributed by the data distributor 438 to the RLC layer 416 of small cell eNB 410. From RLC layer 416 the user plane traffic then proceeds through the MAC layer 414 to physical layer 412.

The embodiment of FIG. 4 above describes a case where the PDUs are provided from one or the other of the small cell 410 or the macro cell 430.

In an alternative embodiment, the RB of the UE may be split between the macro cell and a small cell in order to better adapt to radio conditions and available resources in each cell. This is referred to as bearer splitting. An example of bearer splitting is shown with regard to FIG. 5.

Figure 5:
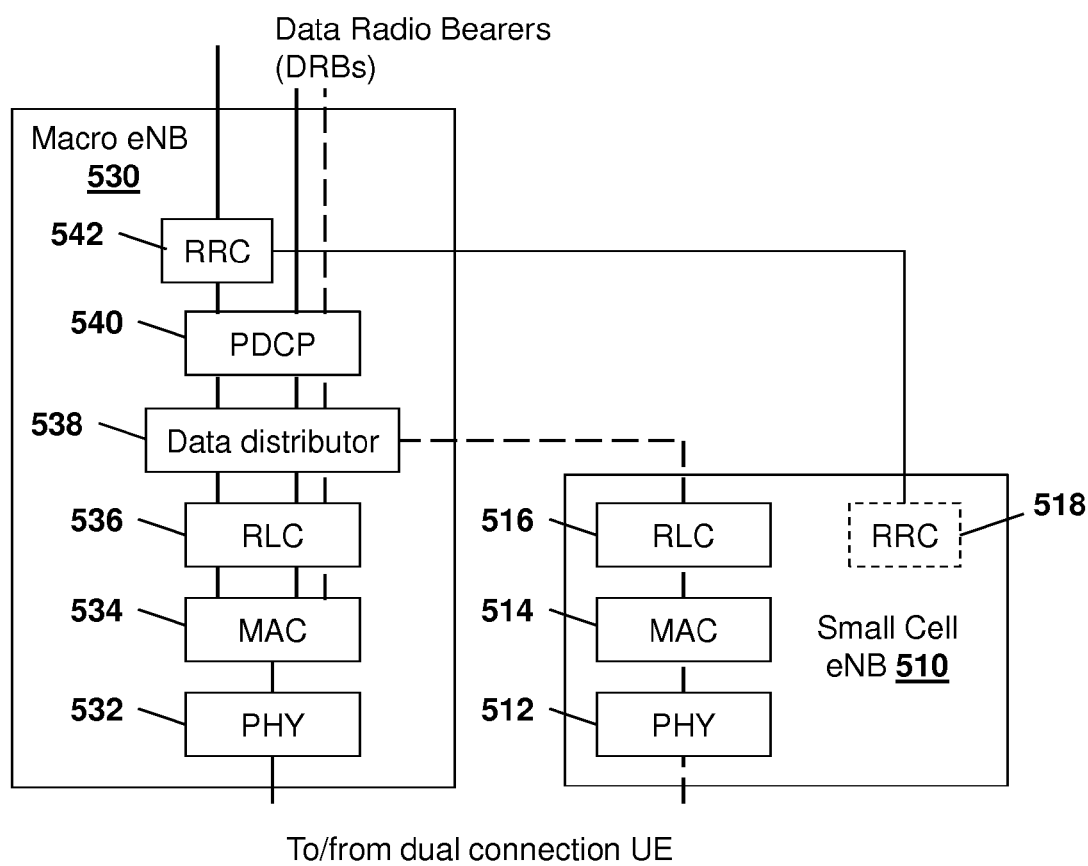
FIG. 5 is block diagram showing a protocol stack for bearer splitting where user plane traffic is split between a macro cell and a small cell between a PDCP layer and an RLC layer.

In particular, in FIG. 5 a similar structure to that provided above with regard to FIG. 4 is provided. In particular, small cell 510 includes physical layer 512, MAC layer 514 and RLC layer 516 along with some RRC functionality shown in layer 518.

Macro eNB 530 includes a physical layer 532, a MAC layer 534, an RLC layer 536, a data distributor 538, a PDCP layer 540 and an RRC layer 542.

The main difference between the embodiments of FIGS. 4 and 5 is that the PDCP PDUs associated with a DRB of a UE are split between the macro cell eNB 530 and the small cell eNB 510, i.e. some of the PDCP PDUs are sent over the macro-cell to the UE and some of the PDCP PDUs are sent over the small cell to the UE. For the same DRB, there is an associated RLC, MAC and PHY entity in both the macro eNB 530 and the small cell eNB 510.

UE Side Protocol Stack

Figure 6:
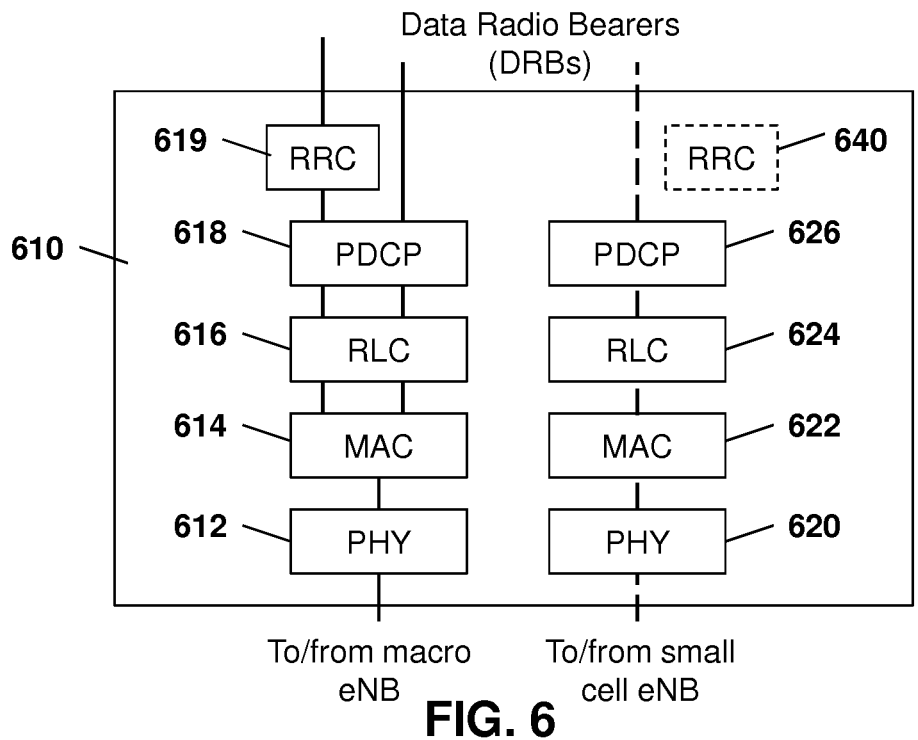
FIG. 6 is a block diagram showing a protocol stack at a user equipment.

At the UE side, in the case where the protocol stack split occurs between the PDCP and RLC layers, a separate physical and MAC layers are needed for connecting to the small cell. Reference is now made to FIG. 6.

In particular, in the example of FIG. 6, the UE side protocol stack 610 includes a physical layer 612 and MAC layer 614 for communicating with the macro-eNB. Similarly, a physical layer 620 and MAC layer 622 are provided for communicating with the small cell eNB.

For communications to/from the macro eNB, after the MAC layer 614, control and user plane traffic is split and proceeds through RLC layer 616, PDCP layer 618 and, in the case of user plane data, proceeds to the data radio bearers. For the control plane the signaling proceeds through the RRC layer 619.

With regard to communications to/from the small cell, data from the small cell proceeds to physical layer 620, MAC layer 622 and then proceeds to RLC layer 624, PDCP layer 626 and then to the data radio bearers.

In the case of FIG. 6, there is no change in the RLC and PDCP layers at the UE side.

Figure 7:
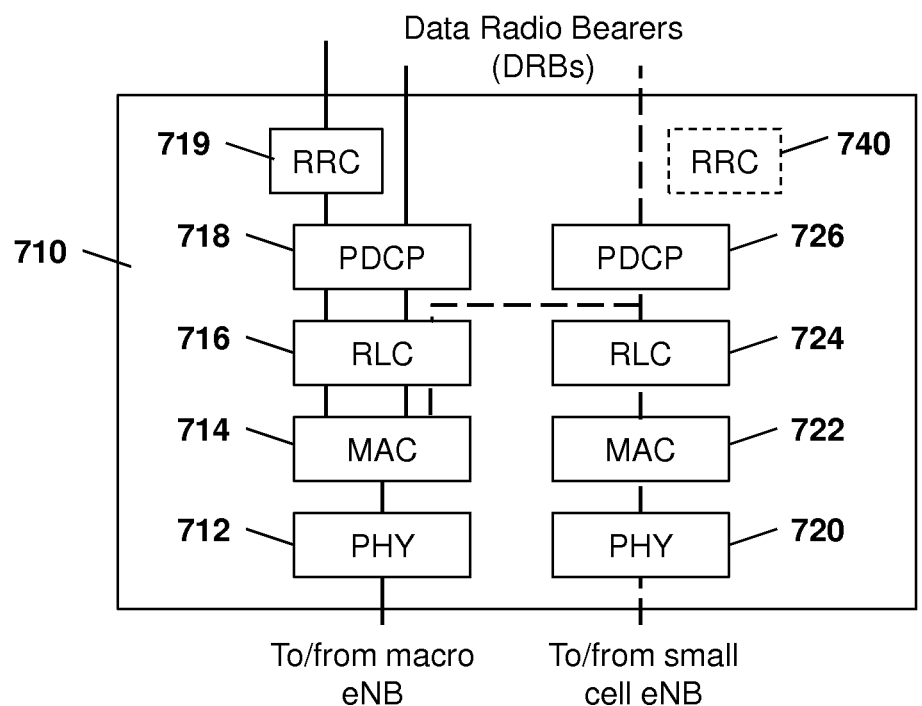
FIG. 7 is a block diagram showing a protocol stack for bearer splitting at a user equipment.

In the case of a bearer split illustrated in FIG. 5 above, the protocol stack may need to change slightly. In particular, reference is now made to FIG. 7. In FIG. 7, a physical layer 712 and a MAC layer 714 are used for communication with the macro-eNB whereas a physical layer 720 and a MAC layer 722 are for communication with the small cell eNB. The macro side of the UE protocol stack further includes RLC layer 716, PDCP layers 718 and 726 and further control plane RRC layer 719.

On the small cell side of the UE protocol stack, RLC layer 724 is provided.

As seen in FIG. 7, both RLC layers 716 and 724 communications may be provided to PDCP 726 in case of bearer splitting.

For both the embodiment of FIG. 6 and the embodiment of FIG. 7, a light RRC layer 640 and 740 respectively may be implemented to handle small cell related tasks that may be directly communicated to the small cell or through the macro eNB.

As seen with regard to FIG. 7, the PDCP layer may need to handle different packet delays through the two data paths and thus may need to be modified. Specifically, with regard to the PDCP layer, PDCP entities may be associated with either one or two RLC entities depending on the radio bearer characteristics. Such characteristics may include that the communication is uni-directional or bi-directional. The PDCP entity is also associated with one or two RLC entities depending on the RLC mode.

Several PDCP entities may be defined for a UE. Each PDCP entity carrying user plane data may be configured to use header compression. Each PDCP entity carries data of one radio bearer. A PDCP entity is associated either to the control plane or user plane depending on which radio bearer it is carrying data for.

Figure 8:
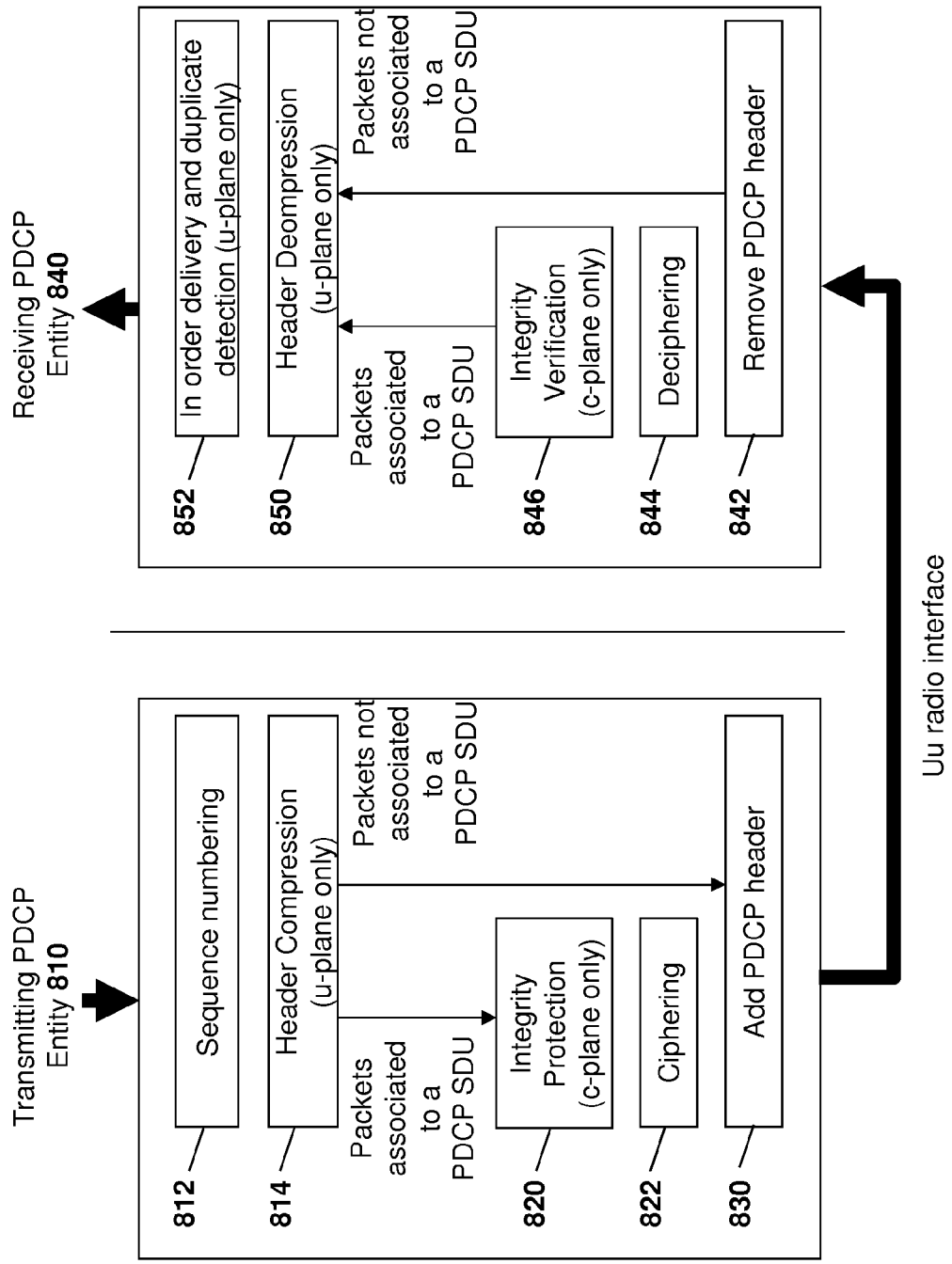
FIG. 8 is a block diagram showing PDCP transmitting and receiving functionality.

Reference is now made to FIG. 8, which represents the functional view of a PDCP entity for a PDCP sub-layer. As seen in FIG. 8, for a transmitting PDCP entity 810, the process proceeds through block 812, which provides for sequence numbering, to block 814, which provides for header compression for user plane (u-plane) data only.

Packets associated to a PDCP service data unit (SDU) then proceed to block 820, which provides for integrity protection for control plane (c-plane) data only, to block 822, which provides for ciphering.

From block 822 or from block 814 for packets not associated to a PDCP SDU, the process proceeds to block 830 in which a PDCP header is added. The transmissions then proceed through the remaining protocol stacks and are transmitted over a physical interface such as a Uu interface, to a receiving PDCP entity 840.

At the receiving PDP entity 840, the process proceeds to block 842 in which a PDCP header is removed.

Packets that are associated with a PDCP SDU are then deciphered at block 844 and integrity verification is provided at block 846. From block 846, or for packets that are not associated with a PDCP SDU, the process then proceeds to block 850 in which the header decompression for user plane is provided. The process then proceeds to block 852 in which the order of delivery and duplicate protection is provided for user plane data.

The PDCP layer provides its services to RRC and user plane upper layers and such services include the transfer of user plane data, the transfer of control plane data, header compression for user plane data, ciphering and integrity protection for control plane data.

The PDCP expects various services from the RLC layer, including: an acknowledgement of data transfer services including an indication of successful delivery of PDCP PDUs; an unacknowledged data transfer service; in-sequence delivery, except at a re-establishment of lower layers; and duplicate discarding, except at a re-establishment of lower layers.

The packet data convergence protocol supports various functionality. Such functionality includes: header compression and decompression of internet protocol (IP) data flows on the robust header compression (ROHC) protocol; transfer of control or user plane data, maintenance of PDCP sequence numbers (SNs); in-sequence delivery of upper layer PDUs at re-establishment of lower layers; duplicate elimination of lower layer SDUs at re-establishment of lower layers for radio bearers mapped on the RLC acknowledged moded (AM); ciphering and deciphering of user plane and control plane data; integrity protection and integrity verification of control plane data; integrity protection and integrity verification of user plane data for relay nodes (RNs); timer based discard; and duplicate discarding.

RLC Layer

The functions of the RLC sub layer are performed by RLC entities. An RLC entity can be configured to perform data transfer in one of three modes. Such modes include the Transparent Mode (TM), Unacknowledged Mode (UM) or Acknowledged Mode (AM). Consequently, an RLC entity is categorized as a TM RLC entity, an UM RLC entity or an AM RLC entity depending on the mode of data transfer that the RLC entity is configured to provide.

A TM RLC entity is configured either as a transmitting TM RLC entity or as a receiving TM RLC entity. An UM RLC entity is configured either as a transmitting UM RLC entity or a receiving UM RLC entity. An AM RLC entity consists of a transmitting side and a receiving side.

A transmitting RLC entity receives RLC SDUs from upper layers including PDCP or RRC, and sends RLC PDUs to its peer receiving RLC entity via lower layers. The receiving RLC entity delivers RLC SDUs to upper layers such as PDCP or RRC, and receives RLC PDUs from its peer transmitting RLC entity via lower layers.

For AM RLC, the RLC entity also provides an indication of successful delivery of upper layers PDUs.

The RLC layer expects services from the MAC, including notification of a transmission opportunity, together with the total size of the RLC PDUs to be transmitted in the transmission opportunity. RLC PDUs are formed only when a transmission opportunity has been notified by the MAC and are then delivered to the MAC.

The following functionality is supported by the RLC sub layer: transfer of upper layer PDUs; error correction through automatic repeat request (ARQ), for AM data transfer; concatenation, segmentation and reassembly of RLC SDUs for UM and AM data transfer; re-segmentation of RLC data PDUs for AM data transfer; reordering of RLC data PDUs for UM and AM data transfer; duplicate detection for UM and AM data transfer; RLC SDU discard for UM and AM data transfer; RLC re-establishment; and protocol error detection for AM data transfer.

LTE Handover

Further to the above, various functionality may exist at the RLC for handover. In particular, for acknowledged mode DRBs, upon handover the source eNB may forward, in order, to the target eNB, all downlink PDCP SDUs with their SN that have not been acknowledged by the UE. In addition, the source eNB may also forward without a PDCP SN fresh data arriving over an S1 interface (a standard LTE interface between the SGW and an eNB) to the target eNB.

Upon handover, the source eNB forwards to the Serving Gateway the uplink PDCP SDUs successfully received in-sequence until the sending of the Status Transfer message to the target eNB. At that point, the source eNB stops delivering uplink PDCP SDUs to the S-GW and discards any remaining uplink RLC PDUs. Correspondingly, the source eNB does not forward the uplink RLC context to the target eNB.

The source eNB then either discards the uplink PDCP SDUs received out of sequence if the source eNB has not accepted the request from the target eNB for uplink forwarding or if the target eNB has not requested uplink forwarding for the bearer during the Handover Preparation procedure, or forwards to the target eNB the uplink PDCP SDUs received out of sequence if the source eNB has accepted the request from the target eNB for uplink forwarding for the bearer during the Handover Preparation procedure.

The PDCP SN of the forwarding SDUs is carried in the PDCP PDU number field of the General Packet Radio Service (GPRS) Tunneling Protocol User Plane (GTP-U) extension header. The target eNB uses the PDCP SN if available in the forwarding GTP-U packet.

For normal handover, in-sequence delivery of the upper layer PDUs during handover is based on a continuous PDCP SN and is provided by the "in-order delivery and duplicate elimination" function at the PDCP layer.

After normal handover, when the UE receives a PDCP SDU from the target eNB, it can deliver this SDU to higher layers together with all the PDCP SDUs with lower SNs, regardless of possible gaps. For handovers involving a Full Configuration, the source eNB behaviour is unchanged from that described above. The target eNB may not send PDCP SDUs for which delivery was attempted by the source eNB.

The target eNB identifies these by the presence of the PDCP SN in the forwarded GTP-U packet and discards them.

After a Full Configuration handover, the UE delivers the received PDCP SDU from the source cell to the higher layers regardless of possible gaps. The UE discards uplink PDCP SDUs for which transmission was attempted and retransmission of these over the target cell is not possible.

For unacknowledged mode, upon handover, the source eNB does not forward to the target eNB the downlink PDCP SDUs for which transmission has been completed in the source cell. The PDCP SDUs that have not been transmitted may be forwarded. In addition, the source eNB may forward fresh downlink data arriving over the S1 to the target eNB. The source eNB discards any remaining downlink RLC PDUs. Correspondingly, the source eNB does not forward the downlink RLC context to the target eNB. Upon handover, the source eNB forwards all uplink PDCP SDUs successfully received to the serving gateway. In other words, the forwarding includes SDUs received out of sequence. The source eNB then discards any remaining uplink RLC PDUs. Correspondingly, the source eNB does not forward the uplink RLC context to the target eNB.

The splitting of the protocol stack and handovers present several issues. A first issue relates to data delivery indications from RLC to PDCP. A second issue relates to possible packet loss with an existing PDCP discard timer. A third issue relates to RRC signaling of DRB split. Each is discussed below.

Data Delivery Indication from RLC to PDCP

In existing PDCP and RLC protocol layers, for an acknowledged data transfer service, the PDCP expects to receive an indication of successful delivery of PDCP PDUs from the RLC. For example, this is provided in the 3GPP TS 36.323, *"Evolution Universal Terrestrial Radio Access (E-UTRA):Packet Data Convergence Protocol (PDCP) Specification"*, v.11.2.0, March 2013, the contents of which are incorporated herein by reference. The above PDCP specification provides, in section 4.3.2, that the PDCP expects the following services from the RLC layer: acknowledged data transfer service, including indication of successful delivery of PDCP PDUs.

Further, the RLC specification provides for data delivery indications. In particular such RLC specification is provided at the 3GPP TS 36.322, *"Evolution Universal Terrestrial Radio Access (E-UTRA):Radio Link Control (RLC) Protocol Specification"* v.11.0.0, September 2012, the contents of which are incorporated herein by reference. Section 5.1.3.1.1 of the 3GPP 36.322 Specification provides that:

When receiving a positive acknowledgement for an AMD PDU with SN=VT(A), the transmitting side of an AM RLC entity shall:
set VT(A) equal to the SN of the AMD PDU with the smallest SN, whose SN falls within the range VT(A)<=SN<=VT(S) and for which a positive acknowledgment has not been received yet.
if positive acknowledgements have been received for all AMD PDUs associated with a transmitted RLC SDU:
send an indication to the upper layers of successful delivery of the RLC SDU. (emphasis added)

When such an indication is received by the PDCP entity, it removes the corresponding SDU from its transmission buffer.

An unacknowledged PDCP SDU is kept in the buffer until either the associated discard timer expires, at which point the SDU is removed from the buffer, or a handover occurs, at which point the downlink SDU is forwarded to the target eNB. Since the PDCP and RLC are currently implemented on the same eNB, how the indication is delivered from the RLC to the PDCP it is an implementation issue.

However, when the PDCP is implemented in one eNB while the corresponding RLC is implemented in another eNB, the indication mechanism over the backhaul needs to be defined for the eNB inter-operation, especially with a non-ideal backhaul.

Further, if an indication for each successfully delivered PDCP PDU is sent over the backhaul, excessive backhaul signalling may be expected.

Further, the RLC specification above states that "when indicated from upper layer (i.e. PDCP) to discard a particular RLC SDU, the transmitting side of an AM RLC entity or the transmitting UM RLC entity shall discard the indicated RLC SDU if no segment of the RLC SDU has been mapped to the RLC data PDU yet." In this case, with the RLC and PDCP not located in the same network node, the discard indication from the PDCP layer to the RLC layer still needs to be delivered. There is no current mechanism to provide for such delivery.

Further, when a single data bearer is split between the macro cell and the small cell, part of the PDCP PDUs may be kept in the macro cell and part of the PDCP PDUs may flow into the small cell. In this case, for the PDUs in the macro cell, a legacy indication between the RLC and PDCP, which is implementation based, could still be used.

For the PDUs that flow into the small cell, the PDUs may not be in order in this case. For example, PDUs with SN 1, 4, 7, 8 may be in the macro cell while the PDUs with SN 2, 3, 5, 6, 9, 10 may be in the small cell. Such split may be handled by a new packet delivery indication mechanism over the backhaul between the small cell eNBs and the macro-cell eNBs, as described below.

For bearers mapped to RLC AM mode, when a UE needs to be switched from one small cell (source cell) to another small cell (target cell), the undelivered PDCP PDUs in the source small cell may be forwarded to the target small cell. A large forwarding delay is another issue.

Possible Packet Loss

A second issue related to possible packet loss, were in the existing PDCP there is a discard timer associated with each PDCP SDU. A PDCP SDU is discarded if the corresponding discard timer expires. Due to backhaul latency, the indication of successful PDCP PDU delivery by the RLC in the small cell may experience a delay over the backhaul. In this case, an undelivered PDCP SDU may be removed from the PDCP buffer if the same discard timer is used without considering backhaul latency. If the current discarding mechanism is not modified, there is a likelihood that a PDCP SDU will be discarded prematurely, causing packet loss to higher layer protocols including the transport control protocol (TCP), real time protocol (RTP) at the transport layer, among others, and an unnecessary decrease of the packet rate.

For lossless handover, the consequence of such packet loss is that the dropped PDCP SDU will not be transferred to the target eNB and thus will be lost, causing application layer retransmission of the packet.

RRC Signaling of DRB Split

A third issue is that in existing LTE specifications, a single PDCP/RLC/MAC is associated with a data bearer. In this case, the existing RRC signalling configures only one RLC entity for each bearer.

In case of a bearer split between the macro eNB and the small cell eNB, a DRB may be associated with two RLC/MAC entities, one in the macro eNB and the other in the small cell eNB. This configuration may need to be signaled to the corresponding UE during a small cell data offload. More specifically the PDCP entity in the UE may need this information so that the UE can establish two RLC entities for the bearer, one towards the macro-cell and the other towards the small cell. Such signaling is not possible using existing RRC messages.

Successful PDCP PDU Delivery Indication

In accordance with one embodiment of the present disclosure, one possible way to provide for a data delivery indication from RLC to PDCP is the use of a PDCP PDU delivery indication from the small cell. In this embodiment, the small cell periodically sends a message about the successfully delivered PDCP PDUs per acknowledged mode (AM) RLC to the macro cell over a backhaul interface. The message may include various information, including some or all of, but not limited to:

The sequence number (SN) of the first PDCP PDU that has been successfully delivered A bitmap indicating the delivered and undelivered PDCP PDUs The hyperframe number (HFN) of the PDCP PDUs The data radio bearer (DRB) number The UE identity at the macro-cell backhaul interface The small cell ID The macro-cell ID Alternatively, the macro-cell PDCP layer may send a request to the small cell asking for a feedback report about successfully delivered PDCP SDUs since the last request.

Alternatively, the small cell may send a message about the successfully delivered PDCP PDUs per acknowledged mode (AM) RLC when certain conditions are satisfied. For example, when the number of unsuccessful delivered PDCP PDUs exceed a threshold value, or when the number of successful delivered PDCP PDUs exceed a threshold value, or when there is no PDCP PDU for delivery in the buffer for a certain time, etc.

When a report is received by the corresponding PDCP receiving entity in the macro eNB, the PDCP SDUs that have been successfully delivered may be dropped from the PDCP SDU buffer.

If a small cell change request from the RRC is received by the PDCP in the macro eNB before receiving the next report from the small cell, in one embodiment the macro eNB may forward the PDCP SDUs that are still in its buffer to the target small cell. This forwarding avoids both excessive backhaul signalling and long data interruptions during a small cell change.

Figure 9:
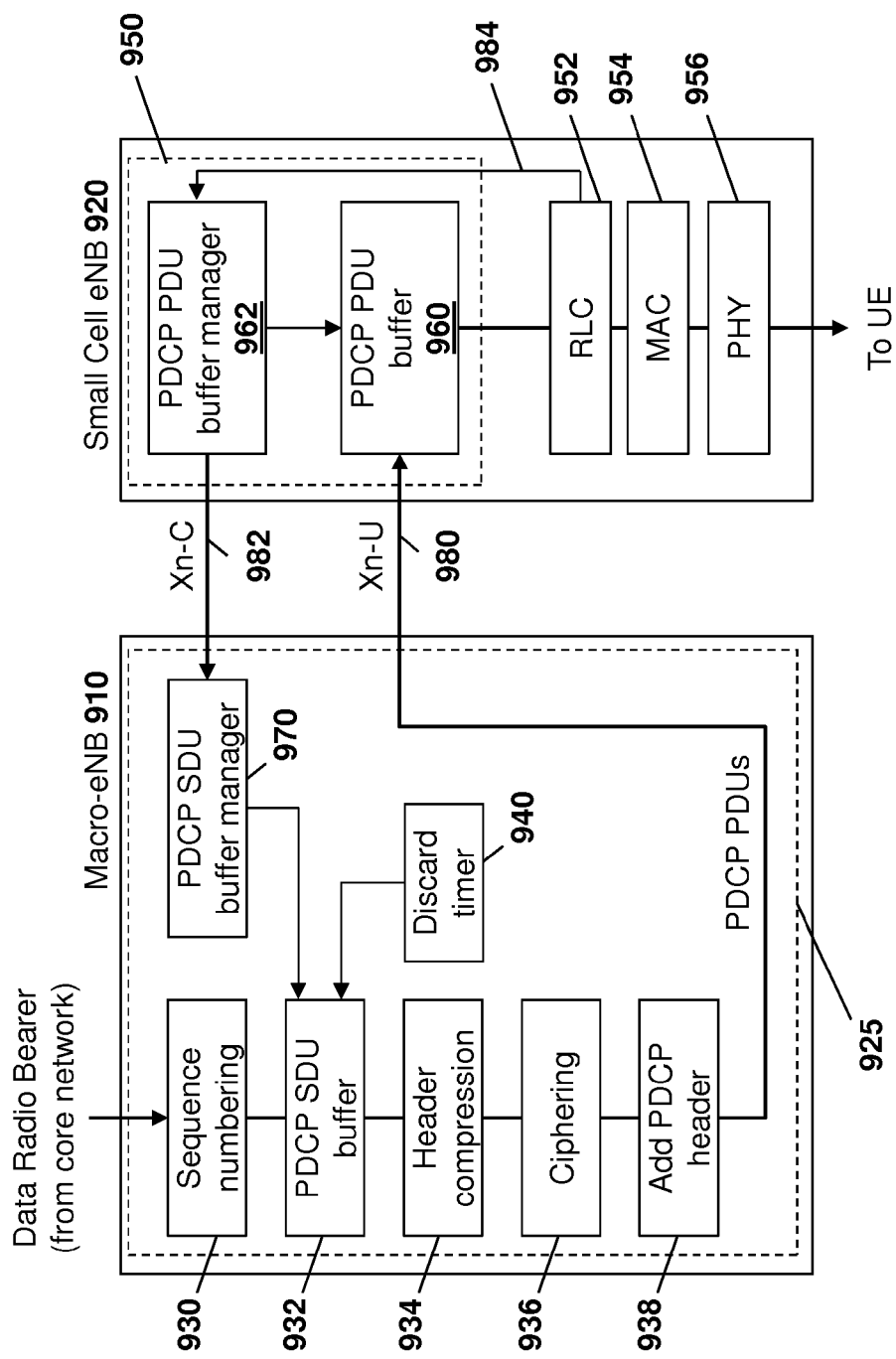
FIG. 9 is a block diagram showing a protocol stack in which a small cell includes a PDCP PDU buffer and buffer manager to compile a PDU acknowledgement report.

In particular, reference is now made to FIG. 9. As seen in FIG. 9, a macro eNB 910 communicates with a small cell eNB 920.

On the macro eNB 910, data from a radio bearer from the core network proceeds through the PDCP layer 925, which includes sequence numbering block 930, PDCP SDU buffer 932, header compression block 934, ciphering block 936, the PDCP header adding block 938.

Further, a discard timer 940 is connected to the PDCP SDU buffer for discarding SDU packets.

On the small cell eNB 920, a quasi-PDCP layer 950 is provided. Further, an RLC layer 952, a MAC layer 954 and a physical layer 956 are provided on the small cell eNB. After the physical layer, a transmission is made to the UE.

Within the quasi PDCP layer 950 on small cell eNB 920, a PDCP PDU buffer 960 is provided. Further, a PDCP PDU buffer manager 962 is provided. Each is discussed below.

Similarly, on macro eNB 910, a PDCP SDU buffer manager 970 is provided.

Thus, in the example of FIG. 9, the PDCP layer is implemented in the macro cell 910 while the lower layers are implemented in a small cell 920. PDCP PDUs are delivered from the macro cell to the small cell over the user plane backhaul interface, referred to herein as the Xn-U interface 980. The new PDCP buffer management functionalities from blocks 962 and 970 are used instead of sending the PDCP PDU delivery indications from the small cell eNB RLC layer to the macro-cell PDCP layer directly over a control plane backhaul interface, referred to herein as Xn-C interface 982.

Instead, a PDCP PDU buffer 960 and the associated buffer manager 962 may be implemented in the small cell. The PDCP PDU buffer manager 962 receives indications of successful PDCP PDU delivery from the RLC layer, as shown by reference by reference 984, and may keep a record of:

A set of PDCP PDUs that have been successfully delivered as indicated by RLC layer; and A set of PDCP PDUs that have not been acknowledged by the RLC layer.

The new PDCP PDU buffer 960 and the corresponding management function provided in small cell eNB 920 can be considered to be a "slave PDCP" or a "dummy PDCP".

In the above embodiment, there is no change in the PDCP layer at the UE, which communicates to the peer PDCP entity in the macro-eNB. Specifically, the small cell can be transparent to the PDCP layer in the UE. Therefore, no PDCP re-establishment is required upon small cell switching, resulting in less interruption compared to a "split over PDCP" alternative. However, dedicated lower layers such as RLC and MAC are still utilized on the UE side for the small cell.

On the macro eNB side, downlink data transfer procedures are provided below. In particular, at the reception of a PDCP SDU from the upper layers, the macro eNB 910 performs normal PDCP functions, including associating a sequence number with the PDCP SDU, starting a discard timer associated with the PDCP SDU if configured, header compression of IP data flows, ciphering and deciphering of user plane data and control plane data, integrity protection and integrity verification of control plane data, generation of a corresponding PDCP PDU, and delivery of the PDCP PDU to the lower layers in the small cell eNB 920 over a backhaul link.

When the discardTimer expires for the PDCP SDU, or when confirmation of successful delivery of the PDCP SDU is received using a PDCP status report sent from the small cell eNB, the macro eNB 910 may discard the PDCP SDU with the corresponding PDCP PDU. If the corresponding PDCP PDU has already been submitted to the lower layers in the small cell, but acknowledgement from RLC has not yet been received, a discard may be indicated to the lower layers in the small cell through the Xn-C interface 982.

Figure 10:
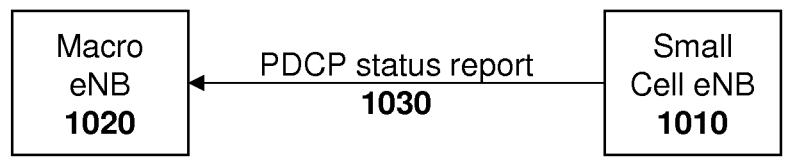
FIG. 10 is a block diagram showing a small cell sending a PDCP status report to a macro cell.

Reference is now made to FIG. 10 which shows small cell eNB 1010 providing macro eNB 1020 with the PDCP status report 1030. As indicated above, this may be done over the control interface 982 from FIG. 9.

Figure 11:
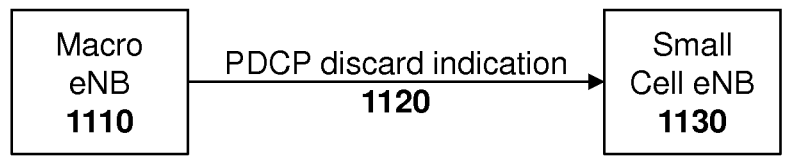
FIG. 11 is a block diagram showing a macro cell sending a PDCP discard indication to a small cell.

Referring to FIG. 11, the macro eNB 1110 may then send a PDCP discard indication 1120 to small cell eNB 1130 using the control interface 982 from FIG. 9.

PDCP status report and the PDCP PDU discard indication may use various messaging. Several examples of such messaging are provided below.

PDCP Status Report from Small Cell to Macro Cell

At the transmitting side of an AM RLC entity, if positive acknowledgements have been received for all AM data PDUs associated with a transmitted RLC SDU then an indication may be sent to the upper layers (i.e. PDCP) regarding the successful delivery of the RLC SDU.

If the positive acknowledgements from RLC transmitting side to PDCP transmitting side are for PDCP PDUs that are in sequence, the indication or status report can be the highest sequence number of successfully delivered PDCP PDUs.

However, the positive acknowledgement from the RLC transmitting side to the PDCP transmitting side may not be in sequence. In this case, the status report from the RLC entity in the small cell to the PDCP entity in the macro-cell may need to be in a vector form.

Figure 12:
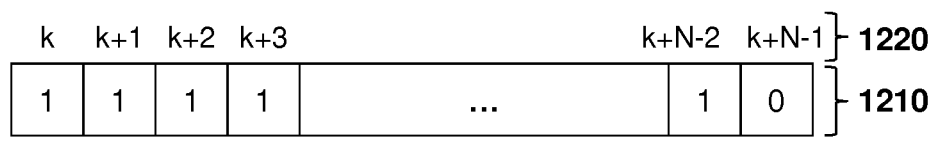
FIG. 12 is a block diagram of an example bitmap for a PDU acknowledgment receipt report.

After the status of certain number of PDCP PDUs has been collected, the small cell may send a status report to the macro-cell over the backhaul link 982 for each data radio bearer mapped to AM RLC. The report may include some or all of the following information, among other information:

- The number of PDCP PDUs in the report
- the successfully delivered PDCP PDUs and the corresponding sequence numbers (SNs)
- The hyperframe number (HFN) of the PDCP PDUs
- The data radio bearer (DRB) number, or the PDCP entity information
- The UE identity at the macro-cell backhaul interface and possibly also the UE ID at the small cell side of the backhaul interface
- The small cell ID
- The macro-cell ID The delivered PDCP PDUs may be reported by using a bitmap. For example, reference is now made to FIG. 12, which shows a bitmap 1210 providing a bit for each successfully delivered PDU. In the embodiment of FIG. 12, a successfully delivered PDU is indicated by "1" in the bitmap, while an undelivered PDU is indicated by a "0". This is however not limiting and the reverse may be true. Further, if each indication contains more than one bit, then other values may be used.

The PDU starting sequence number (k in the example of FIG. 12) at the start of the bitmap, as well as the PDCP hyper frame number (HFN), may also be included in the report. Thereafter, each bit or set of bits can be associated with a PDU sequence number 1220.

When the report is received at the macro-cell, the corresponding PDCP SDU manager may remove SDUs indicated by a "1" in the bitmap from the SDU buffer.

The length of the bitmap of FIG. 12 may be either predefined or included in the report. Thus, the bitmap may be fixed length or may be a variable length where the variable length is reported within the delivery report.

The report may be sent periodically based on the number of PDUs successfully delivered, or based on a predetermined time period. A further option is that the RLC delivery indication may be sent in an event-triggered manner. For example, the event may be a function of the count of the PDCP PDUs. In one embodiment, the RLC delivery indication is sent every N PDCP PDUs successfully delivered, where N can be proportional to the PDCP re-ordering window size.

Figure 13:
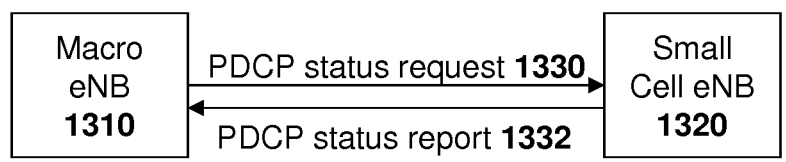
FIG. 13 is a block diagram showing a small cell sending a PDCP status report to a macro cell based on a PDCP status request.

In another embodiment, the report may be request based. To obtain information about the downlink PDCP PDU delivery status from the small cell eNB, the macro-cell PDCP may send a request to the small cell asking for a delivery status report for a set of PDCP SDUs. The request may contain various information, including some or all of the following, among other information:

- The macro-cell ID
- The Small cell ID
- The UE ID
- Radio bearer ID
- The sequence number of the first PDCP PDU requested
- The total number of PDCP PDUs requested Such report is shown with regards to FIG. 13. In particular, macro eNB 1310 communicates with small cell eNB 1320 and makes a PDCP status request 1330. In response, the small cell NB sends a PDCP status report 1332 back.

Request 1330 may be sent as a separate message over the Xn interface.

PDCP SDU Discard Indication

When indicated from the upper layer in the macro-cell eNB to discard a particular PDCP PDU, as shown above with regard to FIG. 11, the transmitting side of an AM RLC entity or the transmitting unacknowledged mode RLC entity in the small cell eNB discard the indicated RLC SDU if no segment of the RLC SDU has been mapped to the RLC data PDU yet. The PDCP discard indication message may include the following information:

- The sequence number (SN) and Hyper-frame number (HFN) of the PDCP PDUs to be discarded
- The data radio bearer (DRB) number, or the PDCP entity information, of the PDCP PDUs
- The UE identity at the small-cell side of the backhaul interface
- The small cell ID
- The macro-cell ID UE Mobility Between Small Cells In the PDCP layer, the PDCP SDUs received out of order are stored in the recording buffer. PDCP SDUs that have been transmitted but have not yet been acknowledged by the RLC layer are stored in the retransmission buffer in the PCDP layer.

During small cell switching, various options are possible to enable the process to occur more efficiently.

In particular, for switching a data offload for a UE from a first small cell to second small cell, when the UE moves out of the coverage of the first small cell and into the coverage range of the second small cell, the following may occur. The first small cell may receive an indication of an "end of offload" via any of the following from the macro eNB: an Xn indication of "End Offload" in which the offloading of the small cell is terminated or a "Last Packet" indication to indicate that no more downlink packets will be passed to the small cell eNB.

In the downlink direction, the PDCP PDU buffer manager in the first small cell may stop delivering PDCP PDUs to the RLC layer and may also send a PDCP PDU delivery status report to the macro eNB indicating that it has successfully delivered PDCP PDUs for radio bearers mapped to the RLC acknowledged mode.

Based on the status report, the macro eNB removes the corresponding PDCP SDUs from its SDU transmission buffer and in the uplink direction the first small cell delivers all received PDCP PDUs from the UE to the macro eNB.

For the user plane radio bearers (i.e. DRBs) mapped on the RLC Unacknowledged Mode, downlink PDCP SDUs that have not yet been transmitted through the first small cell eNB can be forwarded via the Xn interface to the second small cell eNB after offload procedure to the second small cell eNB is complete. Downlink PDCP SDUs for which the transmission has already started, in other words, the corresponding PDUs that have been passed to the first small cell, but which have not been successfully received by the UE will be lost.

For radio bearers that are mapped on RLC Acknowledged Mode, for uplink data at the time of small cell switching the RLC layer receiving side in the first small cell eNB delivers all PDCP PDUs that have already been received to the PDCP layer in the macro eNB in order to have them deciphered and decompressed. Since some PDCP SDUs may not be available at this point, the PDCP SDUs that are not available in-sequence are not delivered immediately by the macro eNB to the serving gateway in the network.

In order to ensure in-sequence delivery in the uplink, the macro eNB, after decompression, stores the PDCP SDUs that are received out-of-sequence in the reordering buffer. Subsequently, the macro eNB may reorder the decompressed PDCP SDUs received from the first small cell eNB and the retransmitted PDCP SDUs received from the second small cell eNB based on the PDCP sequence numbers which are maintained during the small cell switch, and deliver these to the gateway in the correct sequence.

For downlink data, the first small cell eNB may send back to the macro eNB a delivery status of the PDCP PDUs. Such status includes marking the PDCP PDUs that have been acknowledged by the UE with a '1' and marking PDCP PDUs for which reception has not been acknowledged by the UE with a '0'. After receiving the delivery status report, the macro eNB drops the successfully delivered PDCP SDUs from its transmission buffer and sends the undelivered PDCP PDUs to the second small cell eNB for retransmission in the downlink. An example of the signaling procedure over the Xn interface for small cell switching is shown below with regard to FIG. 14.

Figure 14:
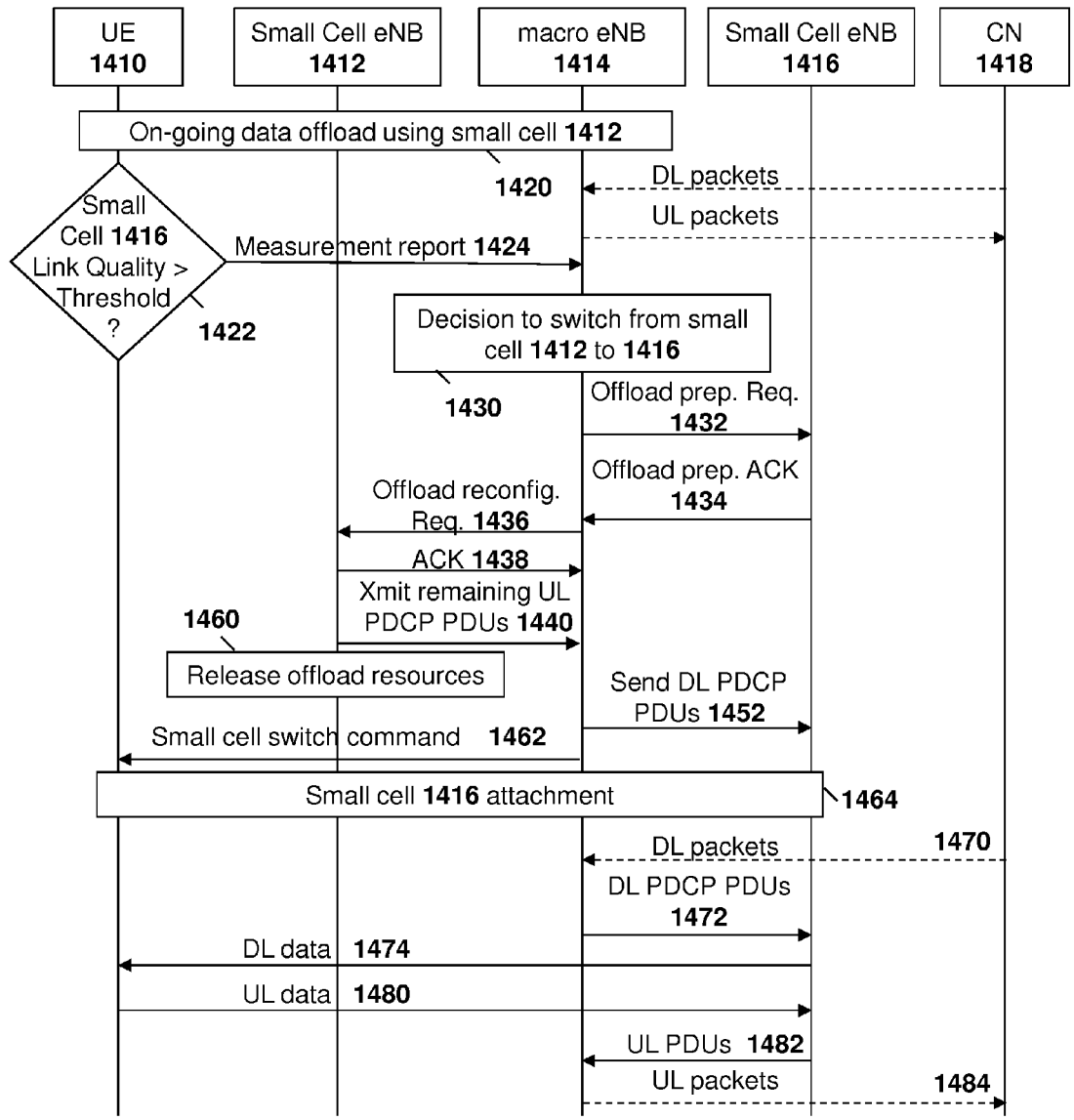
FIG. 14 is a flow diagram showing small cell offload switching.

In particular, referring to FIG. 14, UE 1410 communicates with small cell eNB 1412, macro eNB 1414, second small cell eNB 1416. Further, the various eNBs communicate with core network 1418.

As a precondition, data offloading is occurring from macro eNB 1414 to small cell eNB 1412, as shown by block 1420.

Once UE 1410 determines that small cell 1416 has a link quality greater than a threshold, shown by block 1422, a measurement report 1424 may be sent to macro eNB 1414.

Macro eNB 1414, based on measurement report 1424, may make a decision to switch data offloading from small cell 1412 to small cell 1416, as shown by block 1430. In this regard, an offload preparation request 1432 may be made to the small cell 1416, and an acknowledgement received back as shown at message 1434.

Macro eNB 1414 may then send an offload reconfiguration request 1436 to small cell 1412. Small cell 1412 may then send an acknowledgement 1438.

Based on the offload reconfiguration request, small cell 1412 may also transmit the remaining uplink PDCP PDU packets to macro eNB 1414, as shown by message 1440.

Macro eNB 1414 may also send downlink undelivered PDCP PDUs in message 1452 to small cell 1416.

Once the uplink PDCP PDUs are transmitted at message 1440, the small cell 1412 may then release the offload resources, as shown by block 1460. Macro eNB 1414 may then send UE 1410 a message for a small cell switch, as shown by message 1462.

UE 1410 may then attach to the small cell 1416, as shown by block 1464.

Upon small cell attachment, downlink packets proceed from the core network 1418 through macro eNB 1414 to small cell 1416, as shown by messages 1470 and 1472.

The downlink data is then forwarded in message 1474 to UE 1410.

Similarly, for uplink data, the UE 1410 may send the uplink data to small cell 1416, as shown by message 1480. Such uplink PDUs are then forwarded to the macro eNB 1414, as shown by message 1482 and the uplink packets are then sent to the core network from the macro eNB, as shown by message 1484.

While the procedure of FIG. 14 is similar to the existing handover procedures over the X2 interface, the small cell switching activity is transparent to the core network and since the PDCP SDU buffer resides in the macro eNB, downlink data forwarding is from the macro eNB rather than from the source small cell, to the target small cell. Further, since the PDCP resides in the macro eNB, the PDCP layer does not reset and the sequence numbers continue, as do other PDCP functionalities such as data encryption.

UE Mobility Between Macro-Cells

When the macro cell link is degraded, such that handover is required during the data offload to a small cell eNB, data offloads over all small cells for the UEs are stopped first and then normal procedures are typically used thereafter. A data offload termination indication may be sent to the small cell eNB. In order to avoid degradation of throughput, offloading to a small cell may be terminated before the macro cell switch and may be restarted with a new small cell within the target macro cell.

To provide for seamless handover, for downlink data, PDCP SDUs that have not yet been transmitted may be forwarded by the X2 interface to the target macro-eNB. PDCP SDUs for which transmission has already started, in other words passed to the small cell eNB, but which have not yet been successfully received, may be lost.

For a lossless handover, for uplink data the RLC receiving side in the small cell eNB may deliver all uplink PDCP PDUs that have already been received to the PDCP layer in the macro eNB in order to have them deciphered and decompressed before the header compression protocol is reset. Because some PDCP SDUs may not be available at this point, the PDCP SDUs that are not available in-sequence are not delivered immediately by the macro eNB to higher layers in the gateway in the network. In order to ensure in-sequence delivery in the uplink, the source macro eNB, after decompression, forwards the PDCP SDUs that are received out-of-sequence to the target macro eNB. Subsequently, the target macro eNB can reorder the decompressed PDCP SDUs received from the macro eNB and the retransmitted PDCP SDUs received from the UE based on the PDCP sequence numbers which are maintained during the handover. Such PDCP SDU may be delivered to the gateway in the correct sequence.

In order to ensure lossless handover in the downlink, the small cell eNB may send back a delivery status of PDCP SDUs including marking PDCP PDUs that have been acknowledged by the UE with a '1' and marking PDCP PDUs for which reception has not yet been acknowledged by the UE with a '0'.

After receiving the delivery status report, the source macro eNB may remove the PDCP SDUs acknowledged from its transmission buffer and forward the unacknowledged PDCP SDUs to the target macro eNB for retransmission in the downlink.

PDCP Receiving Status Report from UE

In an alternative embodiment to the above, the macro-cell PDCP may send a request to a peer PDCP entity in the UE asking for a feedback report about successfully received PDCP SDUs since the last request. The request may be sent as a separate PDCP PDU or piggybacked on a PDCP PDU. The feedback message may include, for example:
- The sequence number (SN) of the first PDCP PDU that has been successfully delivered
- A bit map indicating the delivered and undelivered PDCP PDUs
- The hyperframe number (HFN) of the PDCP PDUs
- The data radio bearer (DRB) number
- The small cell ID Alternatively the UE may initiate the sending of the PDCP reception status when the out of sequence PDCP SN exceeds a predetermined window size. The window size may be adapted to the current backhaul latency, small cell loading condition, among other factors. In another alternative, the macro cell may configure the UE to report periodically the reception status regarding the PDCP PDUs from both the macro cell and the small cell.

When a report is received by the corresponding PDCP receiving entity in the macro eNB, the PDCP SDUs that have been successfully delivered may be dropped from the PDCP SDU buffer. If a small cell change request from the RRC is received by the PDCP in the macro eNB before receiving the next report from the small cell, the macro eNB may forward the PDCP SDUs that are still in its buffer to the target cell right away. This avoids both excessive backhaul signalling and long delay interruption during small cell changes. However, some PDCP layer changes may be needed at the UE.

Figure 15:
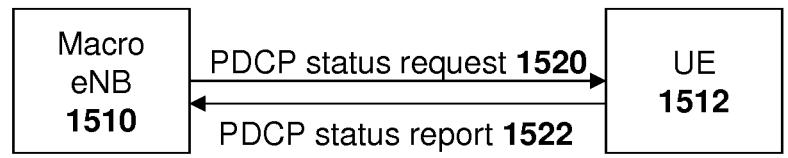
FIG. 15 is a block diagram showing a user equipment sending a PDCP status report to a macro cell based on a PDCP status request.

Reference is now made to FIG. 15. As seen in FIG. 15, macro eNB 1510 communicates with UE 1512. In particular, the macro eNB 1510 sends a PDCP status request 1520 to UE 1512, and in response UE 1512 sends a PDCP status report 1522.

The PDCP status report 1522 may include information, including successfully received PDCP PDUs and the associated sequence numbers, the hyperframe number of the PDCP PDUs and the data radio bearer number, or the PDCP entity information, among other information.

Alternatively, the UE may periodically send a feedback report to the macro cell PDCP layer.

In a further embodiment, the UE may initiate sending the feedback report when an out of sequence PDCP SN exceeds a predetermined window size. The window size may be a parameter determined by the network. The window size further may be adaptable to current backhaul latency, loading conditions in the small cell, among other factors, and such window size may be reported to the UE.

Successful PDCP PDU Delivery Indication in a Bearer Split Scenario

In the case that a single bearer is split between the macro and the small cell, the small cell may need to send a transmission status of its responsible PDCP PDUs to the macro cell. The message may include information, including the transmission status of each PDCP PDU identified by its sequence number, which may be out of order, the hyperframe number of the PDCP PDUs and the data radio bearer number. The message may also include the small cell identifier, the macro cell identifier and the UE identifier. If the message is transmitted over a dedicated Xn-C signaling connection for the UE, the small cell ID or the macro cell ID and the UE ID may not be included.

For retransmission of undelivered PDCP PDUs, the macro eNB may select the currently available small cell or macro eNB resources and may not be required to use the same eNB during initial transmission.

In particular, when a single data radio bearer is split between the macro cell and the small cell, a subset of the PDCP PDUs may be kept in the macro cell and the rest of the PDCP PDUs may flow into the small cell. In this case, for the PDUs in the macro cell, the legacy indication between the PDCP and the RLC, which may be implementation based, could still be used.

For PDUs that flow into the small cell, a status report may be needed to indicate the transmission status to the macro cell. The PDUs may not be in order in this case. For example, PDUs with SN 1, 4, 7, and 8 may be in the macro cell while PDUs with SN 2, 3, 5, 6, 9, 10 may be in the small cell.

The small cell may be configured by the macro cell with the maximum number of PDUs that could be contained in a single report. The report could be periodically transmitted upon request. An example is shown below with regard to FIG. 16, where the IP packets received by the macro-eNB are assigned PDCP SNs and go through the normal processing in a PDCP layer. A "Distributor" is used to split the PDCP PDUs between the macro and the small cell.

Figure 16:
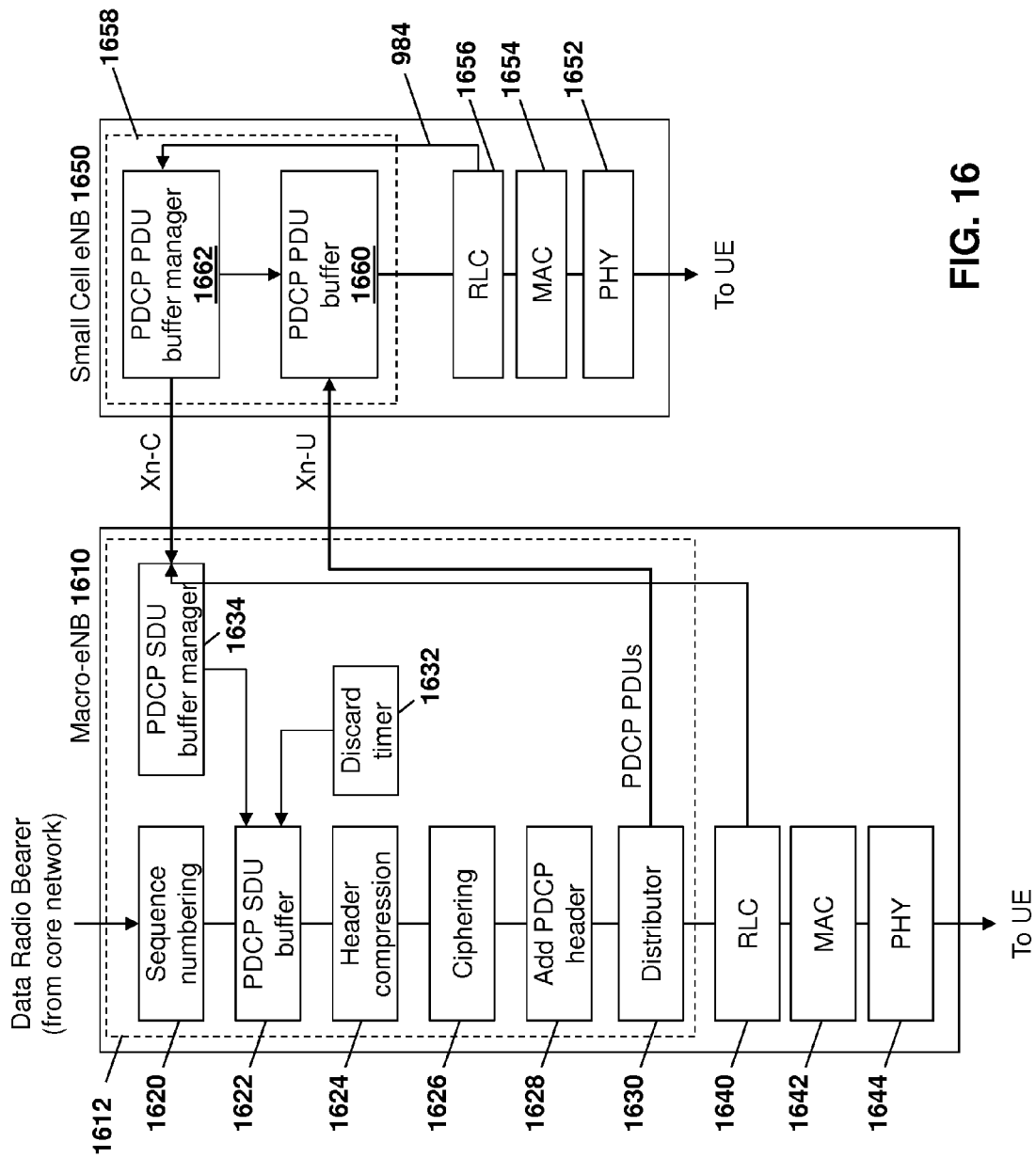
FIG. 16 is block diagram showing a protocol stack for bearer splitting where user plane traffic is split between a macro cell and a small cell between a PDCP layer and an RLC layer.

Referring to FIG. 16, the macro eNB 1610 includes a PDCP entity 1612, which may include sequence numbering block 1620, PDCP SDU buffer 1622, header compression block 1624, ciphering block 1626, PDCP header adding block 1628 and a distributor block 1630.

Further, the PDCP entity 1612 may include a discard timer 1632 and a PDCP PDU buffer manager 1634.

Macro eNB 1610 further includes an RLC layer 1640, a MAC layer 1642 and a physical layer 1644.

Small cell eNB 1650 includes physical layer 1652, MAC layer 1654, RLC layer 1656 and some PDCP functionality as shown by block 1658. In particular, block 1658 includes a PDCP PDU buffer 1660 and a PDCP PDU buffer manager 1662.

In one embodiment, a report between the small cell eNB 1650 and the macro eNB 1610 may include various information, including some or all of the following: the SN of the first report PDU, the total number of reported PDUs, a list of SNs of PDUs that are successfully transmitted or alternatively a list of SNs of PDUs that are failed to be delivered, among other information. The macro cell is aware of how many PDUs are relayed to the small cell so the macro cell is synchronized with the small cell on the PDU SNs. After receiving the status report, the macro cell may remove the successfully transmitted SDUs from its buffer.

In another alternative, a bitmap based approach could be used similar to that described above with regard to FIG. 12.

However, contrary to the embodiment of FIG. 12 above, the macro cell and the small cell should understand that SNs may not be in order. In this case, another approach is that the bitmap could still use the ordering indication, such as K, K+1, K+2, . . . K+N, but for the PDUs that are not in the small cell, a "N/A" status may be indicated. Therefore, instead of one bit per SN, two bits may be used for the field. Alternatively, the small cell may always indicate the PDUs that are not for the small cell with a failed indication but the macro cell RLC may overwrite this status.

PDCP Receiving Status Report from the UE and Bearer Split Scenarios

In a further alternative embodiment, the UE may periodically report its PDCP reception status to the macro cell through the Uu interface. The message may include information including a bitmap based transmission status for PDCP PDUs, the hyperframe number of the PDCP PDUs and the data radio bearer (DRB) number.

Alternatively, the macro cell PDCP layer may send a request to the peer PDCP entity in the UE asking for feedback reports about the successfully received PDCP SDUs since the last request.

Thus, in the bearer split scenario, when considering a split after the PDCP layer, there is only a single PDCP layer residing in the macro cell. In this case, the peer entity in the UE may periodically report its PDCP reception status to the macro cell via the Uu interface. Since the macro cell is the start point for the PDCP PDUs and the UE is the end point of the PDCP PDUs for downlink, the SNs could be maintained with less difficulty. However, more radio resources may be used for this purpose.

In one embodiment, to make reporting or maintenance more efficient, a window based scheme may be implemented in the PDCP layer for both the macro cell and the UE. The window size may be configured by the macro cell and may be subsequently adjusted as needed.

Further, to prevent excessive reporting, a timer based report restriction may be implemented at the UE side.

In one embodiment, the macro cell PDCP may send a request to the peer PDCP entity in the UE asking for a feedback report about the successfully received PDCP SDUs since the last request.

When a report is received by the corresponding PDCP receiving entity in the macro eNB, the PDCP SDUs that have been successfully delivered may be dropped from the PDCP SDU buffer. If a small cell change request from the RRC is received by the PDCP in the macro eNB before receiving the next report from the small cell, the macro eNB may forward the PDCP PDUs that are still in its buffer to the target small cell immediately. This avoids both excessive backhaul signaling and long delay interruptions during small cell changes.

The above embodiment may, however, require some PDCP layer changes at the UE.

In a further alternative, the UE can initiate the PDCP receiving status report when out of sequence PDCP SNs exceed a value that is a function of a predetermined window size. The value may be sent from the macro eNB to the UE and may be adapted for backhaul latency, loading conditions, among other factors.

Discard Timer Relocation

In a further embodiment, in order to avoid backhaul latency, instead of implementing the PDCP discard timer in the PDCP layer at the macro-cell, the discard timer may instead be implemented in the small cell.

Figure 17:
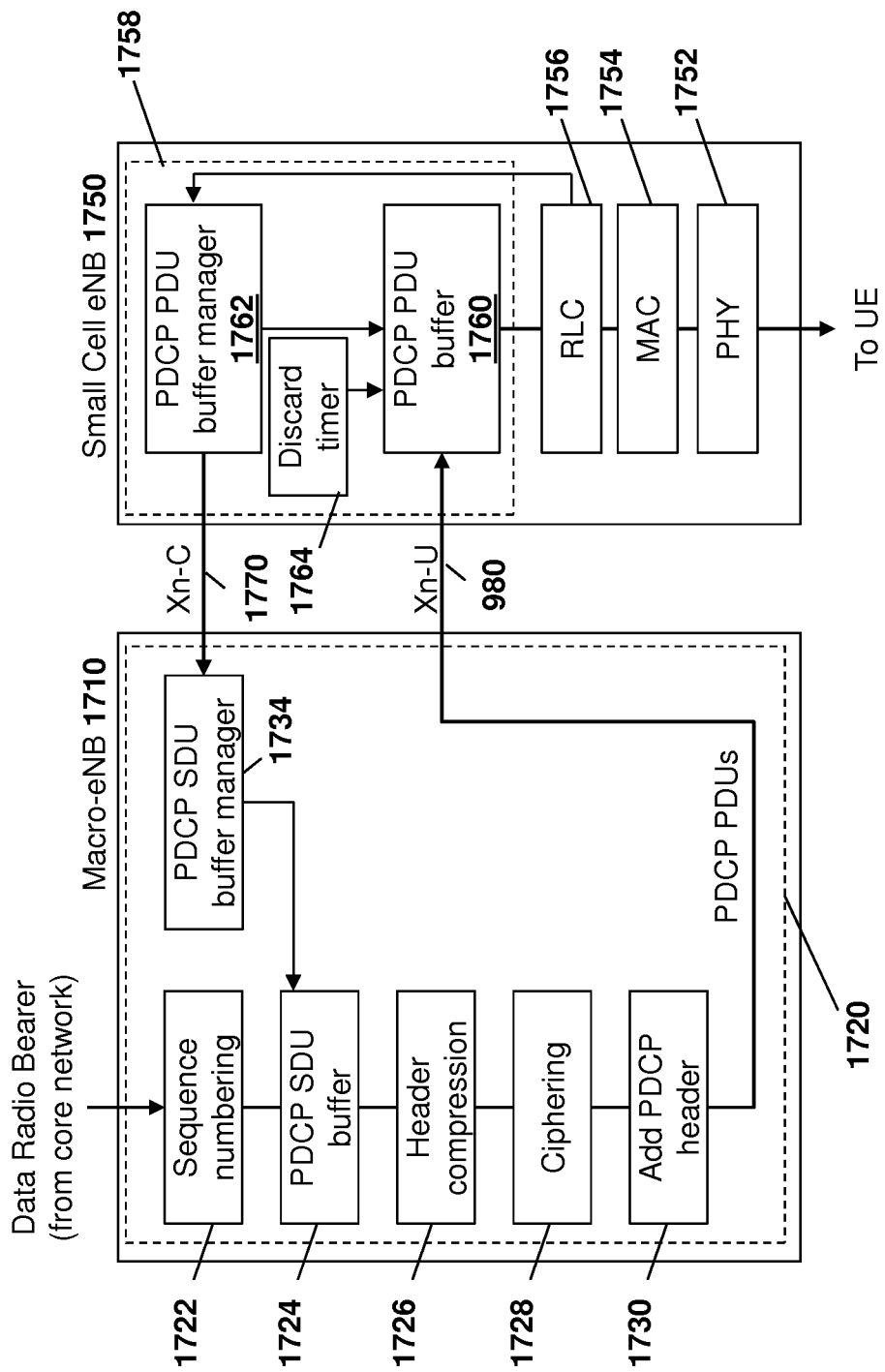
FIG. 17 is block diagram showing a protocol stack in a macro cell and a small cell where a discard timer is moved to the small cell.

Reference is now made to FIG. 17. When each PDCP PDU is received at the small cell, an associated discard timer is started. The small cell informs the macro-cell of the status of the PDCP delivery and discard. A PDU is removed from the small cell PDU buffer if the corresponding discard timer expires or if it has been successfully delivered by the lower layers.

The macro-cell PDCP removes the corresponding PDCP SDUs from its buffer after receiving the status report from the small cell.

In particular, referring to FIG. 17, macro eNB 1710 includes a PDCP entity 1720 which has a sequence numbering block 1722, a PDCP SDU buffer 1724, a header compression block 1726, a ciphering block 1728, an add PDCP header block 1730 and a PDCP SDU buffer manager 1734.

The small cell eNB 1750 includes a physical layer 1752, MAC layer 1754 and RLC layer 1756. Further, some PDCP functionality is placed on the small cell, as shown by block 1758. In particular, block 1758 includes a PDCP PDU buffer 1760, a PDCP PDU buffer manager 1762 and discard timer 1764.

The PDCP PDU buffer manager 1762 communicates with PDCP SDU buffer manager 1734 over a Xn-C interface 1770. The PDCP PDU buffer manager 1762 receives indications of the successful PDCP PDU deliver from RLC layer 1756 and keeps a record of the set of PDCP PDUs that have been successfully delivered and those that have not been acknowledged by the RLC layer. Further, the buffer manager 1762 keeps a set of PDCP PDUs that have been discarded due to discard timer expiration.

A PDCP status report from the small eNB 1750 to macro cell 1710 may include the following information:

The number of PDCP PDUs in the report

The sequence number (SN) of the PDCP PDUs in the report the successfully delivered and/or discarded PDCP PDUs The hyperframe number (HFN) of the PDCP PDUs The data radio bearer (DRB) number, or the PDCP entity information The UE identity at the macro-cell backhaul interface The small cell ID The macro-cell ID A benefit of implementing the PDCP discard timer in the small cell is that the backhaul latency may be considered as part of the overall macro eNB to software gateway latency and the signaling delay between the RLC and PDCP due to the backhaul link may be avoided as far as the timer configuration is concerned. Additionally, the macro-cell eNB may not need to send the PDCP SDU discard indication to the small cell.

In one alternative embodiment, the discard timer may be maintained at the macro cell but the timer may be adapted to the backhaul delay. For example, the discard timer may have a value increased by an amount that accounts for the backhaul delay when determining whether a PDU/SDU should be discarded. For example, if a backhaul delay is 10 ms, this delay may be added to the current discard timer to determine the expiration. Higher backhaul latency leads to longer discard timers and potentially larger PDCP buffers.

When a bearer split occurs, for the PDUs that remain at the macro cell for transmission, the discard timer may be configured without a backhaul delay value. However, PDUs that flow into the small cell could have a maximum backhaul delay added to a configuration discard timer. Therefore, in the macro cell, the PDCP layer maintains two parameters, namely a discard timer and a backhaul delay. Both parameters are configured by the macro cell.

When determining whether a SDU should be discarded by the discard timer, the entity would first check which route the SDU/PDU uses for transmission and then the entity may determine whether the timer should be updated by the backhaul delay. This applies for both the UE PDCP and the macro cell PDCP.

Information Element

For each DRB, a new field may be added to provide the connection configuration for the DRB. In other words, the information provides how the DRB is handled by the small cell.

In one embodiment, the RadioResourceConfigDedicated information element from 3GPP TS 36.323, may be modified in accordance with Table 1 below.

TABLE 1

RadioResourceConfigDedicated Information Element

```
RadioResourceConfigDedicated ::= SEQUENCE {
      srb-ToAddModList    SRB-ToAddModList    OPTIONAL,   -- Cond HO-Conn
      drb-ToAddModList    DRB-ToAddModList    OPTIONAL,   -- Cond HO-
toEUTRA
      drb-ToReleaseList   DRB-ToReleaseList   OPTIONAL,   -- Need ON
      mac-MainConfig                          CHOICE {
            explicitValue     MAC-MainConfig,
            defaultValue      NULL
      }           OPTIONAL,                               -- Cond HO-
toEUTRA2
      sps-Config          SPS-Config    OPTIONAL,        -- Need ON
      physicalConfigDedicated    PhysicalConfigDedicated   OPTIONAL,
      -- Need ON
      ...,
      [[    rlf-TimersAndConstants-r9          RLF-TimersAndConstants-r9
            OPTIONAL    -- Need ON
      ]],
      [[    measSubframePatternPCell-r10       MeasSubframePatternPCell-r10
            OPTIONAL    -- Need ON
      ]],
      [[    neighCellsCRS-Info-r11                        NeighCellsCRS-Info-r11
                        OPTIONAL    -- Need ON
      ]],
      [[    sce-ConfigDedicated-r12                       SCE-ConfigDedicated-
r12                     OPTIONAL
      ]]
}
SCE-ConfigDedicated-r12   ::= SEQUENCE {
      sce-PhysCellId-r12                      PhysCellId,
      sce-carrierFreq-r12                     CarrierFreqEUTRA
      OPTIONAL,
      sce-physicalConfigDedicated-r12 SCE-physicalConfigDedicated-r12
}
DRB-ToAddModList ::=    SEQUENCE (SIZE (1..maxDRB)) OF DRB-ToAddMod
DRB-ToAddMod ::= SEQUENCE {
      eps-BearerIdentity    INTEGER (0..15)    OPTIONAL,  -- Cond DRB-
Setup
      drb-Identity          DRB-Identity,
      pdcp-Config           PDCP-Config        OPTIONAL,  -- Cond PDCP
      rlc-Config            RLC-Config         OPTIONAL,  -- Cond Setup
      logicalChannelIdentity INTEGER (3..10)   OPTIONAL,  -- Cond DRB-
Setup
      logicalChannelConfig LogicalChannelConfig OPTIONAL, -- Cond Setup
      ...,
      sce-DRBConfig-r12 SCE-DRBConfig-r12    OPTIONAL
}
SCE-DRBConfig-r12 :: =     SEQUENCE {
      drb-handling-r12          ENUMERATED {SmallCellOnly, Split},
      rlc-Config-r12            RLC-Config-r12    OPTIONAL,
      pdcp-Config-r12           PDCP-Config-r12   OPTIONAL
}
```

In Table 1, additions based on the embodiments above are shown in bold. In particular, the sce-DRBConfig-r12 indicates how the DRB is carried if signaled. If this parameter is not included, the DRB is carried over a macro cell.

The entire DRB may be carried over a small cell if the drb-handling-r12 is set to SmallCellOnly or the DRB may be split between the macro cell and the small cell if the drb-handling-r12 is set to Split.

If no radio bearer split is applied, the RLC configuration may be indicated by the existing rlc-Config. However, if bearer splitting is applied, the RLC configuration handling two connections or flows may be indicated by a new information element rlc-Config-r12.

Similarly, if no bearer split is applied, PDCP configuration may be indicated by the existing pdcp-Config. However, if bearer split is applied, the PDCP configuration may be indicated by a new information element PDCP-Config-r12. Such new information element may, indicate, for example, the need for PDCP reestablishment.

If the small cell is configured, its physical cell identity, uplink and downlink frequency and physical configuration may be indicated by a new information element sce-ConfigDedicated-r12. The new field may be included in the RadioResourceConfigDedicated information element so that a part of the RRC connection reconfiguration may be used for controlling offloading per DRB.

The above may be implemented by any UEs and network elements.

Figure 18:
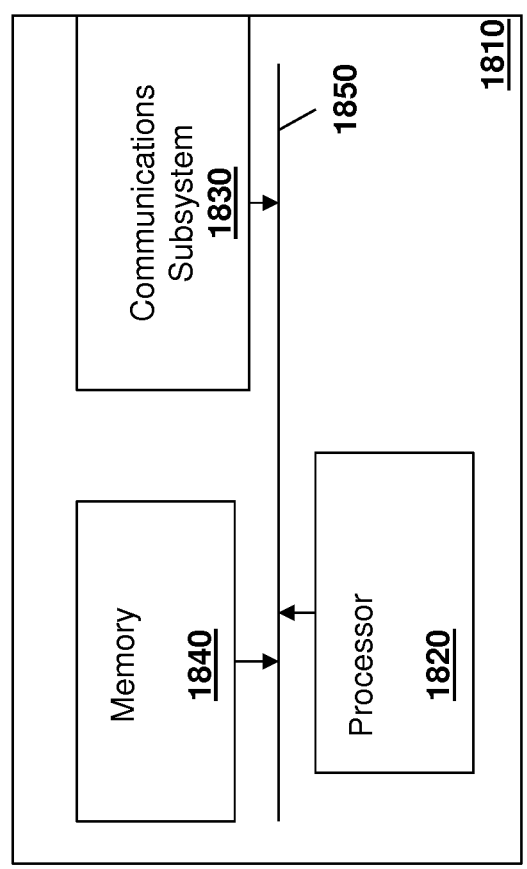
FIG. 18 is a simplified block diagram of a network element for use with the embodiments of the present disclosure.

In particular, the eNBs in the embodiments of FIGS. 1 to 17 above can be any network element, or part of any network element, including various network servers. Reference is now made to FIG. 18, which shows a generalized network element.

In FIG. 18, network element 1810 includes a processor 1820 and a communications subsystem 1830, where the processor 1820 and communications subsystem 1830 cooperate to perform the methods of the embodiments described above.

Processor 1820 is configured to execute programmable logic, which may be stored, along with data, on network element 1810, and shown in the example of FIG. 18 as memory 1840. Memory 1840 can be any tangible storage medium.

Alternatively, or in addition to memory 1840, network element 1810 may access data or programmable logic from an external storage medium, for example through communications subsystem 1830.

Communications subsystem 1830 allows network element 1810 to communicate with other network elements.

Communications between the various elements of network element 1810 may be through an internal bus 1850 in one embodiment. However, other forms of communication are possible.

Further, the above embodiments may be implemented by any UE. One exemplary device is described below with regard to FIG. 19.

UE 1900 is typically a two-way wireless communication device having voice and data communication capabilities. UE 1900 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1900 is enabled for two-way communication, it may incorporate a communication subsystem 1911, including both a receiver 1912 and a transmitter 1914, as well as associated components such as one or more antenna elements 1916 and 1918, local oscillators (LOs) 1913, and a processing module such as a digital signal processor (DSP) 1920. As will be apparent to those skilled in the field of communications, the particular design of the communication subsystem 1911 will be dependent upon the communication network in which the device is intended to operate.

Network access requirements will also vary depending upon the type of network 1919. In some networks network access is associated with a subscriber or user of UE 1900. A UE may require a removable user identity module (RUIM) or a subscriber identity module (SIM) card in order to operate on a CDMA network. The SIM/RUIM interface 1944 is normally similar to a card-slot into which a SIM/RUIM card can be inserted and ejected. The SIM/RUIM card can have memory and hold many key configurations 1951, and other information 1953 such as identification, and subscriber related information.

Figure 19:
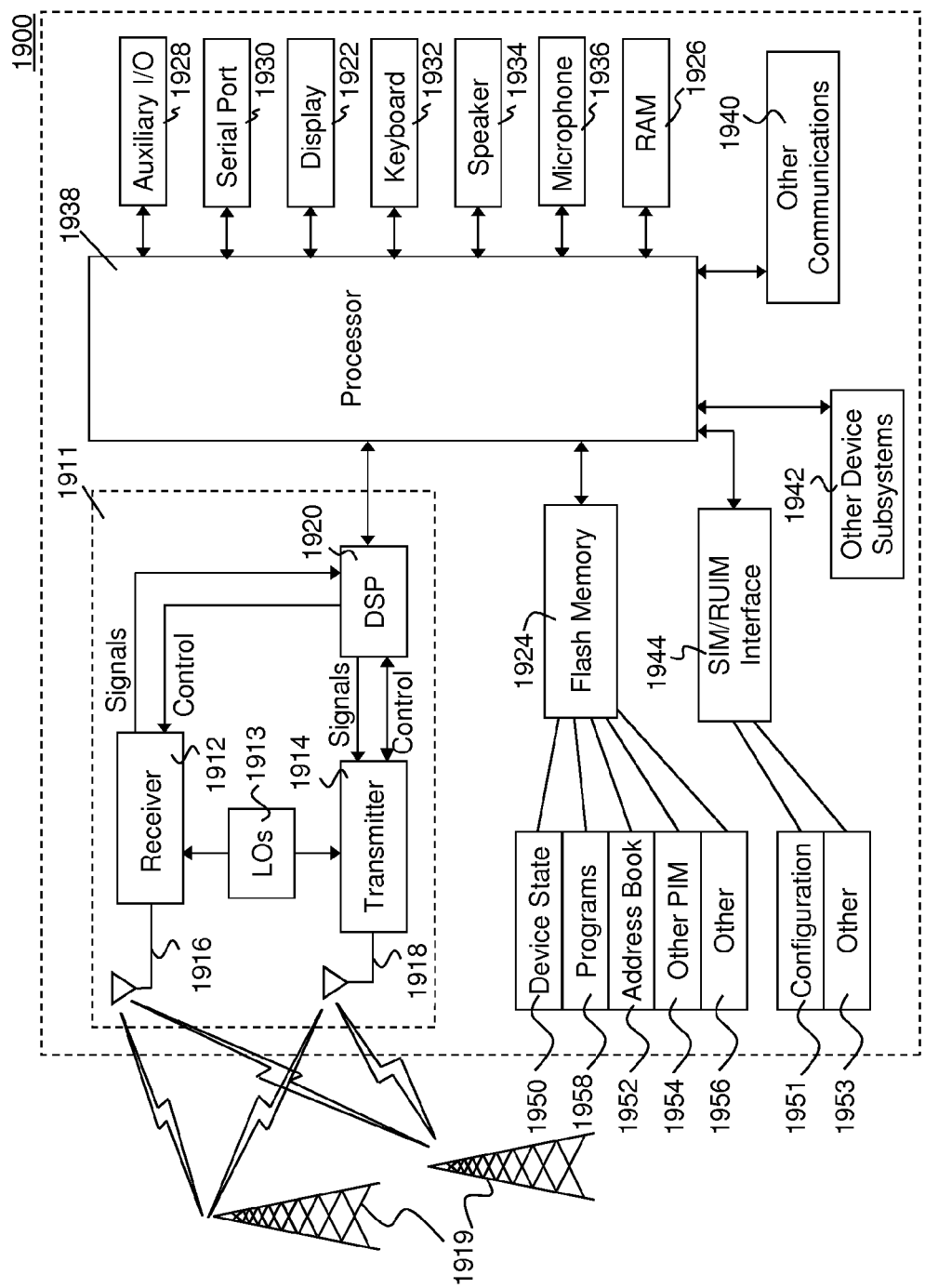
FIG. 19 is a block diagram of an example mobile device capable of being used with the embodiments of the present disclosure.

When required network registration or activation procedures have been completed, UE 1900 may send and receive communication signals over the network 1919. As illustrated in FIG. 19, network 1919 can consist of multiple base stations communicating with the UE.

Signals received by antenna 1916 through communication network 1919 are input to receiver 1912, which may perform such common receiver functions as signal amplification, frequency down conversion, filtering, channel selection and the like. A/D conversion of a received signal allows more complex communication functions such as demodulation and decoding to be performed in the DSP 1920. In a similar manner, signals to be transmitted are processed, including modulation and encoding for example, by DSP 1920 and input to transmitter 1914 for digital to analog conversion, frequency up conversion, filtering, amplification and transmission over the communication network 1919 via antenna 1918. DSP 1920 not only processes communication signals, but also provides for receiver and transmitter control. For example, the gains applied to communication signals in receiver 1912 and transmitter 1914 may be adaptively controlled through automatic gain control algorithms implemented in DSP 1920.

UE 1900 generally includes a processor 1938 which controls the overall operation of the device. Communication functions, including data and voice communications, are performed through communication subsystem 1911. Processor 1938 also interacts with further device subsystems such as the display 1922, flash memory 1924, random access memory (RAM) 1926, auxiliary input/output (I/O) subsystems 1928, serial port 1930, one or more keyboards or keypads 1932, speaker 1934, microphone 1936, other communication subsystem 1940 such as a short-range communications subsystem and any other device subsystems generally designated as 1942. Serial port 1930 could include a USB port or other port known to those in the art.

Some of the subsystems shown in FIG. 19 perform communication-related functions, whereas other subsystems may provide "resident" or on-device functions. Notably, some subsystems, such as keyboard 1932 and display 1922, for example, may be used for both communication-related functions, such as entering a text message for transmission over a communication network, and device-resident functions such as a calculator or task list.

Operating system software used by the processor 1938 may be stored in a persistent store such as flash memory 1924, which may instead be a read-only memory (ROM) or similar storage element (not shown). Those skilled in the art will appreciate that the operating system, specific device applications, or parts thereof, may be temporarily loaded into a volatile memory such as RAM 1926. Received communication signals may also be stored in RAM 1926.

As shown, flash memory 1924 can be segregated into different areas for both computer programs 1958 and program data storage 1950, 1952, 1954 and 1956. These different storage types indicate that each program can allocate a portion of flash memory 1924 for their own data storage requirements. Processor 1938, in addition to its operating system functions, may enable execution of software applications on the UE. A predetermined set of applications that control basic operations, including at least data and voice communication applications for example, will normally be installed on UE 1900 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

Various applications may be loaded onto the UE 1900 through the network 1919, an auxiliary I/O subsystem 1928, serial port 1930, short-range communications subsystem 1940 or any other suitable subsystem 1942, and installed by a user in the RAM 1926 or a non-volatile store (not shown) for execution by the processor 1938. Such flexibility in application installation increases the functionality of the device and may provide enhanced on-device functions, communication-related functions, or both. For example, secure communication applications may enable electronic commerce functions and other such financial transactions to be performed using the UE 1900.

In a data communication mode, a received signal such as a text message or web page download will be processed by the communication subsystem 1911 and input to the processor 1938, which may further process the received signal for output to the display 1922, or alternatively to an auxiliary I/O device 1928.

A user of UE 1900 may also compose data items such as email messages for example, using the keyboard 1932, which may be a complete alphanumeric keyboard or telephone-type keypad, among others, in conjunction with the display 1922 and possibly an auxiliary I/O device 1928. Such composed items may then be transmitted over a communication network through the communication subsystem 1911.

For voice communications, overall operation of UE 1900 is similar, except that received signals would typically be output to a speaker 1934 and signals for transmission would be generated by a microphone 1936. Alternative voice or audio I/O subsystems, such as a voice message recording subsystem, may also be implemented on UE 1900. Although voice or audio signal output is generally accomplished primarily through the speaker 1934, display 1922 may also be used to provide an indication of the identity of a calling party, the duration of a voice call, or other voice call related information for example.

Serial port 1930 in FIG. 19 would normally be implemented in a personal digital assistant (PDA)-type UE for which synchronization with a user's desktop computer (not shown) may be desirable, but is an optional device component. Such a port 1930 would enable a user to set preferences through an external device or software application and would extend the capabilities of UE 1900 by providing for information or software downloads to UE 1900 other than through a wireless communication network. The alternate download path may for example be used to load an encryption key onto the device through a direct and thus reliable and trusted connection to thereby enable secure device communication. As will be appreciated by those skilled in the art, serial port 1930 can further be used to connect the UE to a computer to act as a modem or to a charger for charging.

Other communications subsystems 1940, such as a short-range communications subsystem, is a further optional component which may provide for communication between UE 1900 and different systems or devices, which need not necessarily be similar devices. For example, the subsystem 1940 may include an infrared device and associated circuits and components or a Bluetooth™ communication module to provide for communication with similarly enabled systems and devices. Subsystem 1940 may further include non-cellular communications such as WiFi or WiMAX, or near field communications.

Along with the claims, other clauses are also possible. These include:

AA. A method at a first wireless network element comprising: receiving, from a second wireless network element, a plurality of packet data unit (PDUs) for a user equipment; transmitting the PDUs to the user equipment (UE); receiving a discard indication from the second wireless network element to discard a subset of the PDUs; and discarding the indicated subset of PDUs.

BB. The method of clause AA, wherein a discard timer is maintained for a service data unit (SDU) associated with a PDU at the second wireless network element; and the discard indication is generated when the discard timer expires.

CC. The method of clause AA, wherein the first wireless network element is a small cell evolved Node B (eNB) and the second wireless network element is a macro cell eNB.

DD. A first wireless network element comprising a processor, configured to: receive, from a second wireless network element, a plurality of packet data unit (PDUs) for a user equipment; transmit the PDUs to the user equipment (UE); receive a discard indication from the second wireless network element to discard a subset of the PDUs; and discard the indicated subset of PDUs.

EE. A method at a first wireless network element comprising: sending, from the first wireless network element to a second wireless network element, a plurality of packet data unit (PDUs) for a user equipment; receiving a PDU delivery status report from the second wireless network element; and discarding a service data unit (SDU) according to the PDU delivery status report.

FF. The method clause EE, wherein the discarding is applied to a SDU that is successfully delivered according to the PDU delivery status report.

GG. The method of clause EE, wherein the PDUs are packet data convergence protocol (PDCP) layer PDUs.

HH. The method of clause EE, wherein the PDU delivery status report is used to manage packet data convergence protocol (PDCP) layer SDUs at the first wireless network element.

II. The method of clause EE, wherein the PDU delivery status report includes an indicator of PDUs successfully delivered.

JJ. The method of clause EE, wherein the PDU delivery status report includes in indicator of PDUs that are not successfully delivered.

KK. The method of clause EE, wherein the PDU delivery status report is received over a backhaul interface between the second wireless network element and the first wireless network element.

LL. The method of clause EE, wherein the PDU delivery status report includes a bitmap of PDUs with consecutive sequence numbers.

MM. The method of clause EE, wherein the bitmap includes one or more bits for each of a plurality of PDUs.

NN. The method of clause EE, further comprising, prior to the receiving, sending a status request from the first wireless network element to the second wireless network element.

OO. The method of clause EE, further comprising: providing a discard indication to the second wireless network element to discard a subset of the PDUs.

PP. The method of clause EE, further comprising: determining discontinuance for offloading data of the UE to the second wireless network element; sending an offload reconfiguration request to the second wireless network element.

QQ. The method of clause EE, wherein a discard timer is maintained at the second wireless network element for a PDU, the method further comprising: receiving a report from the second wireless network element for one or more PDUs for which the discard timer has expired.

RR. The method of clause EE, wherein the second wireless network element is a small cell evolved Node B (eNB) and the first wireless network element is a macro cell eNB.

SS. A first wireless network element comprising a processor configured to: send, from the first wireless network element to a second wireless network element, a plurality of packet data unit (PDUs) for a user equipment; receive a PDU delivery status report from the second wireless network element; and discard a service data units (SDU) according to the PDU delivery status report.

TT. A method at a first wireless network element comprising: sending, from the first wireless network element to a second wireless network element, a plurality of packet data unit (PDUs) for a user equipment (UE); receiving a delivery status report originating from the UE; and discarding a service data unit associated with a PDU sent to the second wireless network element from a buffer according to the delivery status report.

UU. The method of clause TT, wherein the receiving the status report is performed by a receiving entity of a packet data convergence protocol (PDCP) layer at the first wireless network element.

VV. The method of clause TT, wherein the status report includes at least one of: successfully received PDUs and associated sequence numbers; unsuccessfully received PDUs and associated sequence numbers; hyperframe numbers of PDUs; and data radio bearer numbers.

WW. The method of clause TT, wherein the status report contains a bitmap of successfully and unsuccessfully received PDCP PDUs.

XX. The method of clause TT, wherein the second wireless network element is a small cell evolved Node B (eNB) and the first wireless network element is a macro cell eNB.

YY. The method of clause TT, wherein the delivery status report is received over a wireless link between the UE and the first wireless network element.

ZZ. The method of clause TT, wherein the delivery status report is relayed by the second wireless network element, after the second wireless network element has received a message from the UE via a wireless link.

AAA. The method of clause ZZ, wherein the delivery status report is derived from the message received by the second wireless network element from the UE.

BBB. A first wireless network element comprising a processor configured to: send, from the first wireless network element to a second wireless network element, a plurality of packet data unit (PDUs) for a user equipment (UE); receive a delivery status report originated from the UE; and discard a service data unit associated with a PDU sent to the second wireless network equipment from a buffer according to the delivery status report.

CCC. A method at a first wireless network element comprising: determining establishment of two radio connections for a UE; compiling a control message that contains a radio resource configuration of each of the two radio connections; and sending the control message to the UE.

DDD. The method of clause CCC, wherein the control message contains a radio bearer configuration.

EEE. The method of clause CCC, wherein the control message contains a packet data convergence protocol (PDCP) configuration.

FFF. The method of clause CCC, wherein the control message contains a radio link control (RLC) configuration.

GGG. The method of clause CCC, wherein the control message is delivered over one of the two radio connections.

HHH. The method of clause CCC, wherein the control message is delivered over both radio connections.

III. The method of clause CCC, wherein the control message further contains an indication for establishing two radio connections for the UE.

JJJ. A first wireless network element comprising a processor configured to: determine establishment of two radio connections for a UE; compile a control message that contains a radio resource configuration of each of the two radio connections; and send the control message to the UE.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a first wireless network element comprising:
    receiving, from a second wireless network element, a plurality of packet data units (PDUs) for a user equipment;
    transmitting the PDUs to the user equipment (UE);
    compiling a PDU delivery status report in response to the transmitting of the PDUs; and
    sending the compiled PDU delivery status report to the second wireless network element, the compiled PDU delivery status report comprising a packet data convergence protocol (PDCP) entity identifier for the plurality of PDUs;
    wherein the UE maintains two concurrent wireless connections, one with the first wireless network element, the other with the second wireless network element.

2. The method of claim 1, wherein the PDUs are packet data convergence protocol (PDCP) layer PDUs.

3. The method of claim 1, wherein the compiling is performed by a PDU buffer manager that interacts with a radio link control layer at the first wireless network element.

4. The method of claim 1, wherein the sending utilizes a backhaul interface between the first wireless network element and the second wireless network element.

5. The method of claim 1, wherein the PDU delivery status report includes an indicator of PDUs that are successfully delivered.

6. The method of claim 1, wherein the PDU delivery status report includes an indicator of PDUs that are not successfully delivered.

7. The method of claim 1, wherein the PDUs are radio link control (RLC) layer PDUs.

8. The method of claim 1, wherein the first wireless network element maintains a discard timer on a PDU.

9. The method of claim 1, wherein the second wireless network element maintains a discard timer on a service data unit (SDU) that is associated with a PDU.

10. The method of claim 1, wherein the sending is performed after receiving a status request from the first wireless network element.

11. The method of claim 1, further comprising:
    receiving an offload reconfiguration request from the second wireless network element to terminate a connection with the UE;
    stopping delivery of downlink PDUs to the UE; and
    forwarding a received uplink PDU to the second wireless network element.

12. The method of claim 1, wherein the first wireless network element is a small cell evolved Node B (eNB) and the second wireless network element is a macro cell eNB.

13. A first wireless network element comprising:
    a processor;
    a communications subsystem;
    memory, the memory comprising executable code for execution by the processor, the executable comprising instructions for causing the processor and the communications sub system to:
    receive, from a second wireless network element, a plurality of packet data unit (PDUs) for a user equipment;
    transmit the PDUs to the user equipment (UE);

compile a PDU delivery status report in response to the transmitting of the PDUs; and send the compiled PDU delivery status report to the second wireless network element, the compiled PDU delivery status report comprising a packet data convergence protocol (PDCP) entity identifier;

wherein the UE maintains two concurrent wireless connections, one with the first wireless network element, the other with the second wireless network element.

14. The first wireless network element of claim 13, wherein the PDUs are packet data convergence protocol (PDCP) layer PDUs.

15. The first wireless network element of claim 13, wherein the processor is configured to compile using by a PDU buffer manager that interacts with a radio link control layer at the first wireless network element.

16. The first wireless network element of claim 13, wherein the processor is configured to send utilizing a backhaul interface between the first wireless network element and the second wireless network element.

17. The first wireless network element of claim 13, wherein the PDU delivery status report includes an indicator of PDUs that are successfully delivered.

18. The first wireless network element of claim 13, wherein the PDU delivery status report includes an indicator of PDUs that are not successfully delivered.

19. The first wireless network element of claim 13, wherein the PDUs are radio link control (RLC) layer PDUs.

20. The first wireless network element of claim 13, wherein the first wireless network element maintains a discard timer on a PDU.

21. The first wireless network element of claim 13, wherein the second wireless network element maintains a discard timer on a service data unit (SDU) that is associated with a PDU.

22. The first wireless network element of claim 13, wherein the processor is configured to send after receiving a status request from the first wireless network element.

23. The first wireless network element of claim 13, wherein the processor is further configured to:

receive an offload reconfiguration request from the second wireless network element to terminate a connection with the UE;

stop delivery of downlink PDUs to the UE; and forward a received uplink PDU to the second wireless network element.

24. The first wireless network element of claim 13, wherein the first wireless network element is a small cell evolved Node B (eNB) and the second wireless network element is a macro cell eNB.

\* \* \* \* \*

UNITED STATES PATENT AND TRADEMARK OFFICE
CERTIFICATE OF CORRECTION

PATENT NO.        : 9,648,514 B2                                            Page 1 of 1
APPLICATION NO.   : 13/963676
DATED             : May 9, 2017
INVENTOR(S)       : Blankenship et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 32 days.

Signed and Sealed this

Twenty-fifth Day of September, 2018

Andrei Iancu
*Director of the United States Patent and Trademark Office*